US008199698B2

(12) United States Patent
Kim et al.

(10) Patent No.: US 8,199,698 B2
(45) Date of Patent: Jun. 12, 2012

(54) METHOD AND APPARATUS FOR TRANSMITTING/RECEIVING CONTROL MESSAGE RELATED TO PACKET CALL SERVICE IN AN IP MULTIMEDIA SUBSYSTEM

(75) Inventors: Soeng-Hun Kim, Suwon-si (KR); Sung-Ho Choi, Suwon-si (KR); Osok Song, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 561 days.

(21) Appl. No.: 11/628,797

(22) PCT Filed: Jun. 29, 2005

(86) PCT No.: PCT/KR2005/002041
§ 371 (c)(1),
(2), (4) Date: Aug. 24, 2009

(87) PCT Pub. No.: WO2006/001683
PCT Pub. Date: Jan. 5, 2006

(65) Prior Publication Data
US 2009/0303971 A1    Dec. 10, 2009

(30) Foreign Application Priority Data

Jun. 29, 2004   (KR) .................. 10-2004-0049657
Sep. 17, 2004   (KR) .................. 10-2004-0074767

(51) Int. Cl.
*H04W 4/00* (2009.01)
(52) U.S. Cl. ........................ 370/328; 370/522
(58) Field of Classification Search .............. None
See application file for complete search history.

(56) References Cited

U.S. PATENT DOCUMENTS

| 2003/0026245 A1 | 2/2003 | Ejzak |
| 2004/0180675 A1* | 9/2004 | Choi et al. ............ 455/458 |
| 2005/0041578 A1* | 2/2005 | Huotari et al. ........ 370/229 |
| 2005/0152275 A1* | 7/2005 | Laurila et al. ........ 370/241 |

(Continued)

FOREIGN PATENT DOCUMENTS

EP    1246479    10/2002

(Continued)

OTHER PUBLICATIONS

XP 002324385, Push-To-Talk over Cellular (PoC) User Plan; (E) GPRS/UMTS Specification PoC (Release 2.0), 15 pages.

(Continued)

*Primary Examiner* — Kevin C Harper
(74) *Attorney, Agent, or Firm* — Roylance, Abrams, Berdo & Goodman, LLP

(57) ABSTRACT

Apparatus and Method for transmitting control message related to a packet call service in an IP multimedia subsystem (IMS) that transmits/receives an IMS control message using a control plane to reduce a delay caused by setting of a user plane in a packet call setup process. A user equipment (UE) determines whether an IMS service is registered in response to a radio resource control (RRC) connection request. The UE sets an SRB_IMS request parameter requiring that the IMS control message be processed through a signaling radio bearer (SRB) depending on whether the IMS service is registered. The UE transmits an RRC connection request message including the SRB_IMS request parameter to a radio network controller (RNC). The UE configures an SRB_IMS entity.

54 Claims, 24 Drawing Sheets

U.S. PATENT DOCUMENTS

| | | |
|---|---|---|
| 2005/0193309 A1* | 9/2005 | Grilli et al. .................... 714/752 |
| 2005/0213546 A1 | 9/2005 | Reitter et al. |
| 2007/0053326 A1* | 3/2007 | Ala-Luukko ................. 370/335 |
| 2007/0237134 A1* | 10/2007 | Bergenlid et al. ............. 370/352 |

FOREIGN PATENT DOCUMENTS

| | | |
|---|---|---|
| JP | 2005-531949 A | 10/2005 |
| JP | 2007-527633 A | 9/2007 |
| WO | WO02/05538 | 1/2002 |
| WO | WO 02/05573 A2 | 1/2002 |
| WO | WO0205573 | 1/2002 |
| WO | WO 02/082729 | 10/2002 |
| WO | WO 03/067832 A1 | 8/2003 |
| WO | WO 03/105435 A1 | 12/2003 |
| WO | WO 2004/071104 A2 | 8/2004 |

OTHER PUBLICATIONS

XP 050364294, $3^{rd}$ Generation Partnership Project; Technical Specification Group Service and System Aspects; 3 GPP Enablers for OMA PoC Services; Stage 2 (Release 6), 16 pages.

* cited by examiner

METHOD AND APPARATUS FOR TRANSMITTING/RECEIVING CONTROL MESSAGE RELATED TO PACKET CALL SERVICE IN AN IP MULTIMEDIA SUBSYSTEM

BACKGROUND OF THE INVENTION

1. Field of the Invention

The present invention relates generally to a mobile communication system supporting an IP multimedia subsystem, and in particular, to a method and apparatus for transmitting and receiving an IMS control message.

2. Description of the Related Art

UMTS (Universal Mobile Telecommunication Service), which is a $3^{rd}$ generation mobile communication system, WCDMA (Wideband Code Division Multiple Access) based on European mobile communication systems, GSM (Global System for Mobile Communications) and GPRS (General Packet Radio Services), has been developed toward multimedia communications that transmit a large volume of data such as packet data and circuit data beyond voice service.

FIG. 1 schematically illustrates the configuration of a typical mobile communication system, UMTS.

Referring to FIG. 1, the mobile communication system includes a CN (Core Network) 10 and a plurality of RNSs (Radio Network Subsystems) 11 and 12. The plurality of RNSs 11 and 12 form a UTRAN (UMTS Terrestrial Radio Access Network). The CN 10 is comprised of an SGSN and a GGSN to connect the UTRAN to a packet data network such as the Internet.

The RNSs 11 and 12 include RNCs (Radio Network Controllers) 14 and 17 and a plurality of Node Bs 15, 16, 18 and 19. To be more specific, the RNS 11 has the RNC 14 and the Node Bs 15 and 16. The RNS 12 has the RNC 17 and the Node Bs 18 and 19. The RNCs 14 and 17 are classified into a serving RNC, a drift RNC, and a control RNC. The serving RNC manages information about each UE and is responsible for data transmission with the CN 10, the drift RNC wirelessly connects directly to a UE, and the control RNC controls radio resources for each Node B.

The RNCs 14 and 17 are connected to the Node Bs 15, 16, 18 and 19 via an Iub interface. The RNCs 14 and 17 are connected to each other via an Iur interface. While not shown in FIG. 1, a UE 13 is connected to the UTRAN via a Uu interface. The RNCs 14 and 17 allocate radio resources to the Node Bs 15, 16, 18 and 19, and the Node Bs 15, 16, 18 and 19 actually provide radio the allocated resources to the UE 13. Radio resources are configured on a cell basis and radio resources provided by each Node B are those for a specific cell managed by the Node B. The UE 13 establishes a radio channel using radio resources for a specific cell managed by the Node Bs 15, 16, 18 and 19 and transmits/receives data on the established radio channel. Since the UE 13 identifies only a physical channel configured on a cell basis, distinction between a Node B and a cell is meaningless. Therefore, the Node B is interchangeably used with the cell hereinafter.

With reference to FIG. 2, the Uu interface between a UE and an RNC will be described. The Iu, Iub or Uu interface is used for communications between Nodes illustrated in FIG. 2. The Uu interface is defined separately on a control plane (C-plane) for processing control signals and on a user plane (U-plane).

The control plane is comprised of an RRC (Radio Resource Control) layer 20, an RLC (Radio Link Control) layer 21, and an RLC layer 23. The RLC layer 23 has RLC #1 (23a) to RLC #m (23d).

The user plane is comprised of a PDCP (Packet Data Convergency Protocol) layer 21, a BMC (Broadcast/Multicast Control) layer 22, and RLC #1 (23c) to RLC #n (23d).

Data on the control plane and the user plane are provided to a MAC layer 25 on a logical channel 24 and then to a physical layer 27 on a transport channel 26. The PDCP layer 21, the BMC layer 22, and the RLC layer 23 correspond to Layer 2 (L2) and the physical layer 27 corresponds to Layer 1 (L1) in an OSI (Open Systems Interconnection) system model.

In the above mobile communication system, IMS (IP Multimedia Subsystem) refers to a system that provides a traditional circuit-switched service such as voice service in the form of packet service. For wide use of the IMS, similar call quality and call setup delay to those in the traditional circuit-switched service must be ensured. Control messages used for signaling such as call setup in the IMS are called IMS control messages. A call setup procedure is carried out through message exchanges prior to data transmission in a service where two or more users participate like voice service.

FIG. 3 illustrates a circuit-switched call setup procedure in the typical mobile communication system.

Referring to FIG. 3, upon receipt of a call setup message for a particular UE in step 30, the CN pages the UE in step 31. Upon receipt of the PAGING message, the UE establishes an RRC connection with the RNC in step 32. The RRC connection is set up before the UE starts communications in the UMTS network and RRC messages are transmitted/received on the RRC connection. The RRC connection setup amounts to setting up an SRB (Signaling Radio Bearer) for use in transmission/reception of RRC messages.

In step 33, the UE transmits a PAGING RESPONSE message via the SRB to the RNC. The RNC establishes a signaling connection with the CN to transmit the PAGING RESPONSE message in step 34.

The signaling connection is a logical connection for transmission/reception of control messages on the Iu interface for each UE. It is set up by the first NAS (Non Access Stratum) message that the UE transmits after the RRC connection. The NAS message is a control message in the case where a protocol terminal point resides on the CN. MM (Mobility Management), CC (Call Control), and SM (Session Management) messages are NAS messages.

In step 35, the RNC transmits the PAGING RESPONSE message to the CN via the Iu signaling connection. Upon receipt of the PAGING RESPONSE message, the CN determines that the UE is now able to receive the call setup message and transmits to the RNC the call setup message via the Iu signaling connection in step 36. In step 37, the RNC transmits to the UE a call setup response message via the established SRB.

As described above, the circuit-switched mobile communication system exchanges control messages associated with call setup on the control plane involving the Iu signaling connection and the SRB.

In comparison, call setup-associated control messages are exchanged on the user plane in a packet-switched call setup procedure. For this purpose, the user plane must be first established by exchanging control messages, causing an additional delay.

FIG. 4 illustrates a packet-switched call setup procedure in the typical mobile communication system.

Referring to FIG. 4, upon receipt of a call setup message for a particular UE in step 40, the CN pages the UE in step 41. The call setup message can be a SIP (Session Initiation Protocol) INVITE message.

Upon receipt of the PAGING message, the UE establishes an RRC connection with the RNC in step 42 and transmits to the RNC a PAGING RESPONSE message via an SRB established by the RRC connection in step 43. In step 44, the RNC establishes an Iu signaling connection with the CN before transmitting the PAGING RESPONSE message.

In step 45, the RNC transmits the PAGING RESPONSE message to the CN via the Iu signaling connection.

Upon receipt of the PAGING RESPONSE message, the CN establishes a user plane to transmit the call setup message to the UE in step 46.

The user plane setup refers to generation of PDCP/RLC/MAC-layer entities related to message processing on the user plane. When the user plane setup is completed, the CN transmits an INVITE message to the RNC on the user plane in step 47. In step 48, the RNC transmits the call setup message to the UE on the user plane.

The above-described packet-switched call setup procedure third requires the user plane setup. Therefore, a call setup delay is increased, compared to the circuit-switched call setup procedure.

SUMMARY OF THE INVENTION

An object of the present invention is to substantially solve at least the above problems and/or disadvantages and to provide at least the advantages below. Accordingly, an object of the present invention is to provide an apparatus and method for transmitting control messages associated with a packet call service in order to reduce a time delay caused by setup of a user plane in a packet-switched call setup procedure in an IP multimedia subsystem where IMS control messages are transmitted/received.

To achieve the above object, the present invention provides a method of transmitting/receiving a control message related to a packet call service in an IMS service. In the method, a UE determines whether it has registered to the IMS service, upon receipt of an RRC connection request. Depending on whether the UE has registered to the IMS service, it sets an SRB_IMS requested parameter requesting processing of an IMS control message through an SRB. The UE then transmits an RRC connection request message including the SRB_IMS requested parameter to an RNC, and configures an SRB_IMS entity.

To achieve the above object, the present invention provides a method of transmitting/receiving a control message related to a packet call service in an IMS service. In the method, an RRC connection request message is received from a UE, which includes an SRB_IMS requested parameter requesting processing an IMS control message through an SRB. An SRB_IMS entity is configured according to the SRB_IMS requested parameter. An RNC receives an IMS control message including an IMS indicator from an SGSN and checks the IMS indicator. The RNC transmits the NAS message to the UE via the SRB_IMS entity by the RNC, if the IMS indicator indicates that the NAS message is an IMS control message.

To achieve the above object, the present invention provides a method of transmitting/receiving a control message related to a packet call service in an IMS service. In the method, an RNC receives from a UE an RRC connection request message including an SRB_IMS requested parameter requesting processing an IMS control message through an SRB, configures an SRB_IMS entity according to the SRB_IMS requested parameter, receives from an SGSN an IMS control message including information indicating a GTP tunnel to transmit the IMS control message through, and transmits a NAS message including the IMS control message to the UE via the SRB_IMS entity.

To achieve the above object, the present invention provides a method of transmitting/receiving a control message related to a packet call service in an IMS service. In the method, a UE generates an IMS control message, after setting up an RRC connection, includes the IMS control message in an L3 message, and transmits the L3 message to an SGSN node via an SRB entity for processing an RRC message related to GMM/SM.

To achieve the above object, the present invention provides a method of transmitting/receiving a control message related to a packet call service in an IMS service. In the method, an SGSN receives data from a GGSN through a first GTP tunnel, determines whether a second GTP tunnel to an RNC, corresponding to the first GTP tunnel has been established, if the data is an IMS control message, generates an L3 message including information identifying the first GTP tunnel and the IMS control message, if the second GTP tunnel has not been established, and transmits the L3 message to an SRB entity for processing an RRC message related to GMM/SM of a UE.

To achieve the above object, the present invention provides a method of transmitting/receiving a control message related to a packet call service in an IMS service. In the method, a UE receives from an SGSN a paging message including an IMS signaling indicator indicating incoming of an IMS control message in the SGSN, transmits to an RNC an RRC connection request message including an SRB_IMS requested parameter requesting processing the IMS control message through an SRB in response to the IMS signaling indicator, and configures an SRB_IMS entity for processing the IMS control message.

To achieve the above object, the present invention provides a UE device for transmitting/receiving a control message related to a packet call service using a control plane in an IMS service. In the UE device, an RRC layer has an AS handler and a NAS handler, and receives an RRC connection request message from an SGSN. An IMS controller processes an IMS control message. A plurality of SRBs transmit/receive messages between the RRC layer and radio channels. The SRBs include an SRB_IMS entity for providing the IMS control message to the IMS controller via the NAS handler.

To achieve the above object, the present invention provides a UE device for transmitting/receiving a control message related to a packet call service using a control plane in an IMS service. In the UE device, an RRC layer has an AS handler and a NAS handler, and receives an RRC connection request message from an SGSN. An IMS controller processes an IMS control message and includes information indicating a GTP tunnel to transmit the IMS control message through in the IMS control message. A plurality of SRBs transmit/receive messages between the RRC layer and radio channels. The SRBs include an SRB_IMS entity for providing the IMS control message to the IMS controller via the NAS handler.

To achieve the above object, the present invention provides a UE device for transmitting/receiving a control message related to a packet call service using a control plane in an IMS service. In the UE device, an IMS controller generates and processes an IMS control message. An L3 controller generates and processes an L3 message. A switch switches the IMS controller to the L3 controller or a radio bearer. An SRB entity is switched to the switch through the L3 controller, and processes the IMS control message.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

In accordance with first two embodiments of the present invention, if a UE needs to establish a signaling radio bearer for an IMS control message (hereinafter, referred to as SRB_IMS), it transmits to an RNC an RRC CONNECTION REQUEST message with an SRB_IMS indicator. In a third embodiment of the present invention, the UE includes high-speed SRB setup information in an RRC CONNECTION REQUEST message and thus transmits an IMS control message via an existing SRB, thereby providing a higher SRB transmission rate than available in the conventional technology.

A fourth embodiment of the present invention is characterized in that an SGSN notifies a UE whether a call of interest is an IMS call or not, transmitting a PAGING message to the UE. Thus, the UE can determine whether the call is an IMS call at a call termination.

The present invention is intended to utilize existing Iu signaling connection and control plane for reception of an IMS control message in a packet-switched call setup procedure.

<<First Embodiment>>

Figure 1:
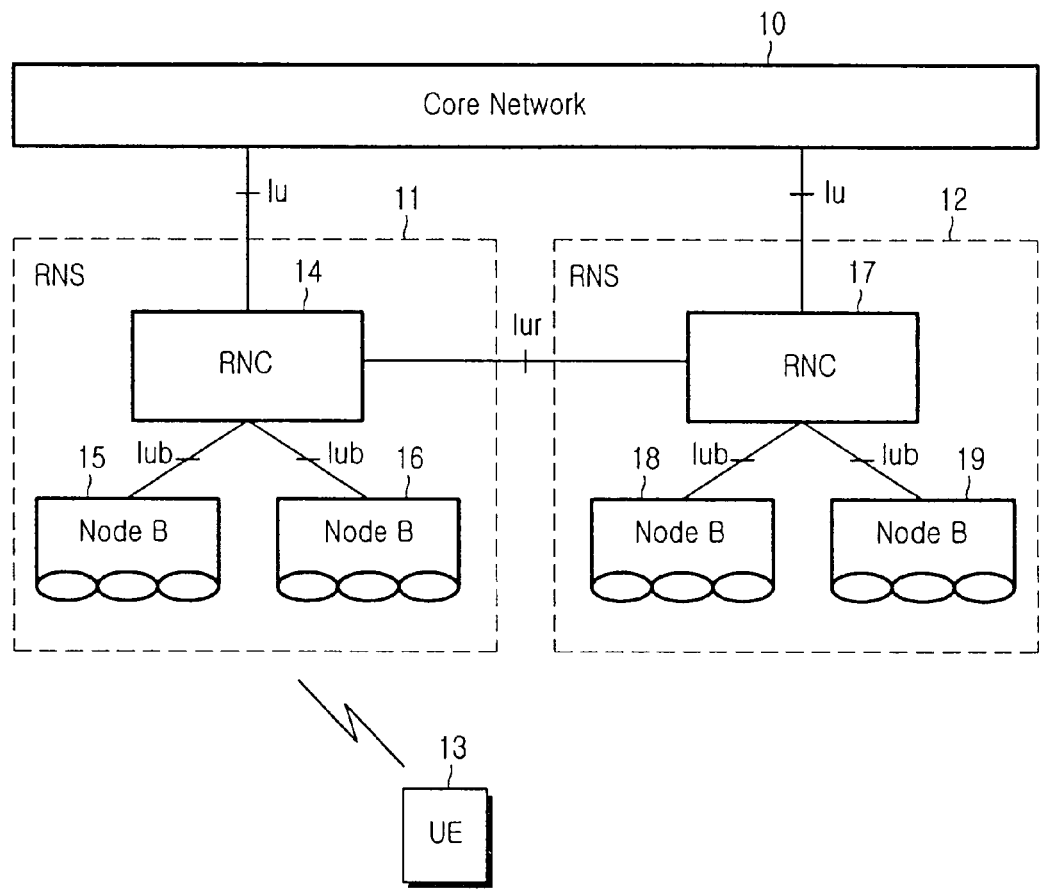
FIG. 1 schematically illustrates the configuration of a typical mobile communication system.
Figure 2:
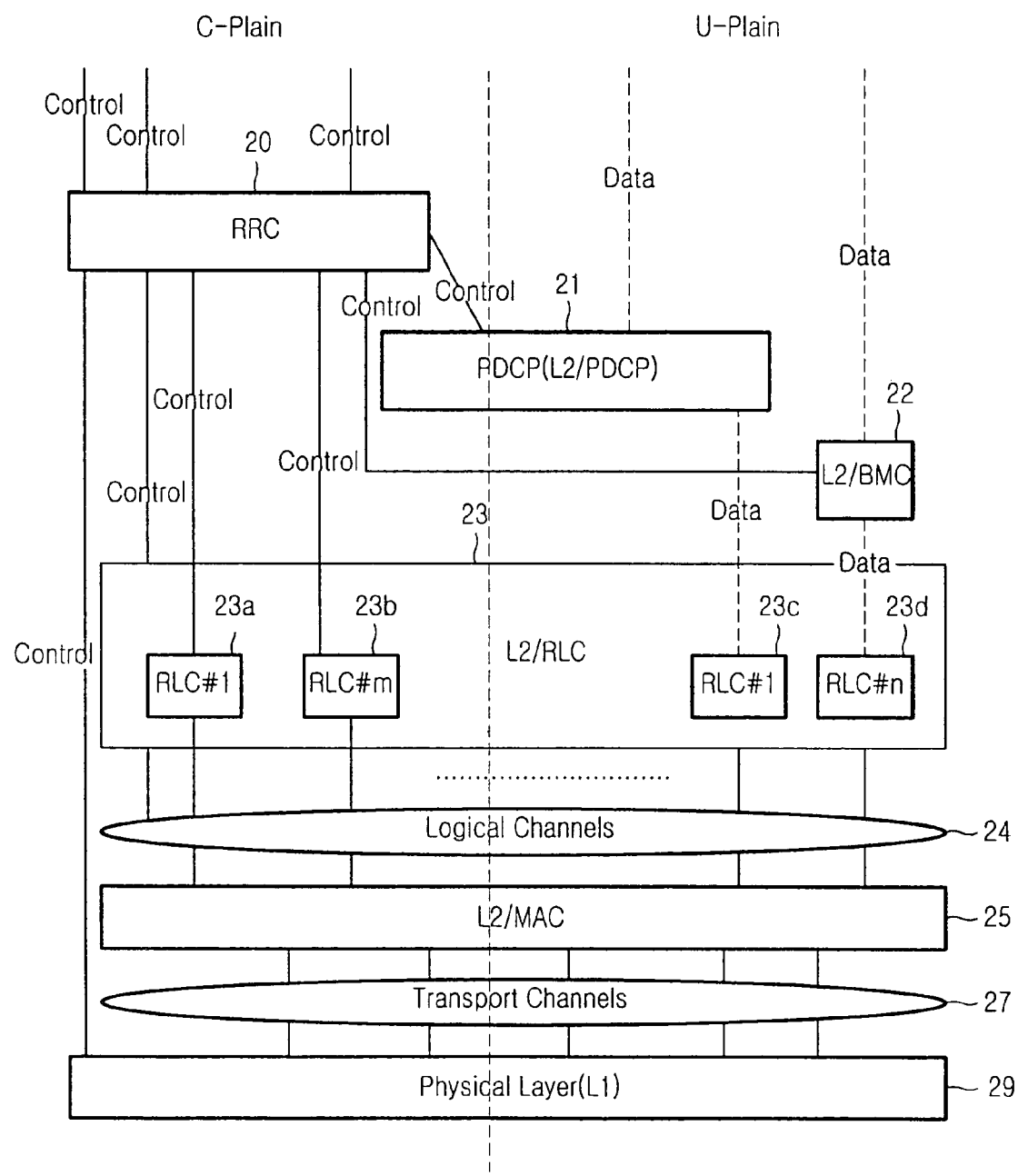
FIG. 2 illustrates a Uu interface established between a UE and an RNC.
Figure 3:
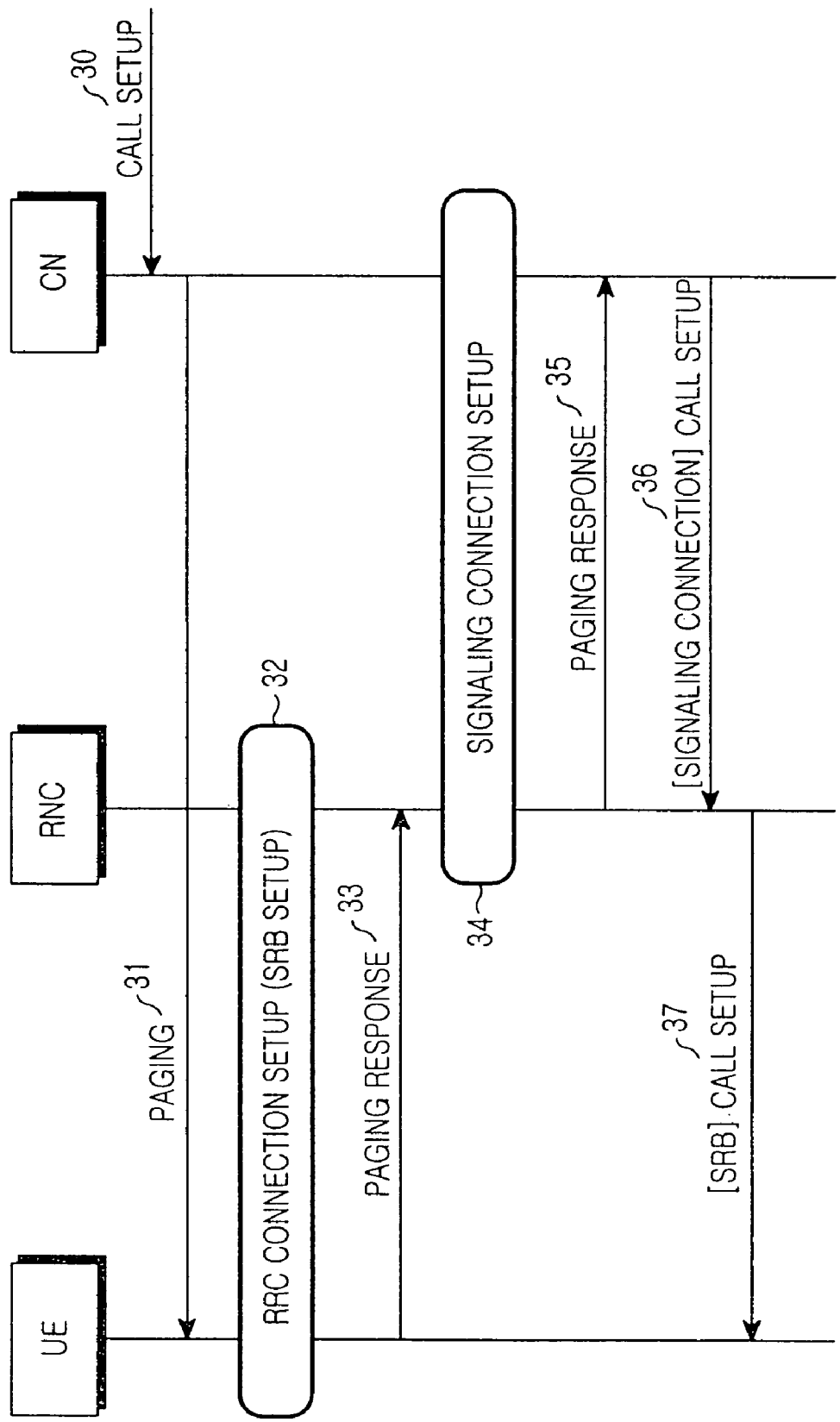
FIG. 3 illustrates a call setup procedure in a typical circuit-switched mobile communication system.
Figure 4:
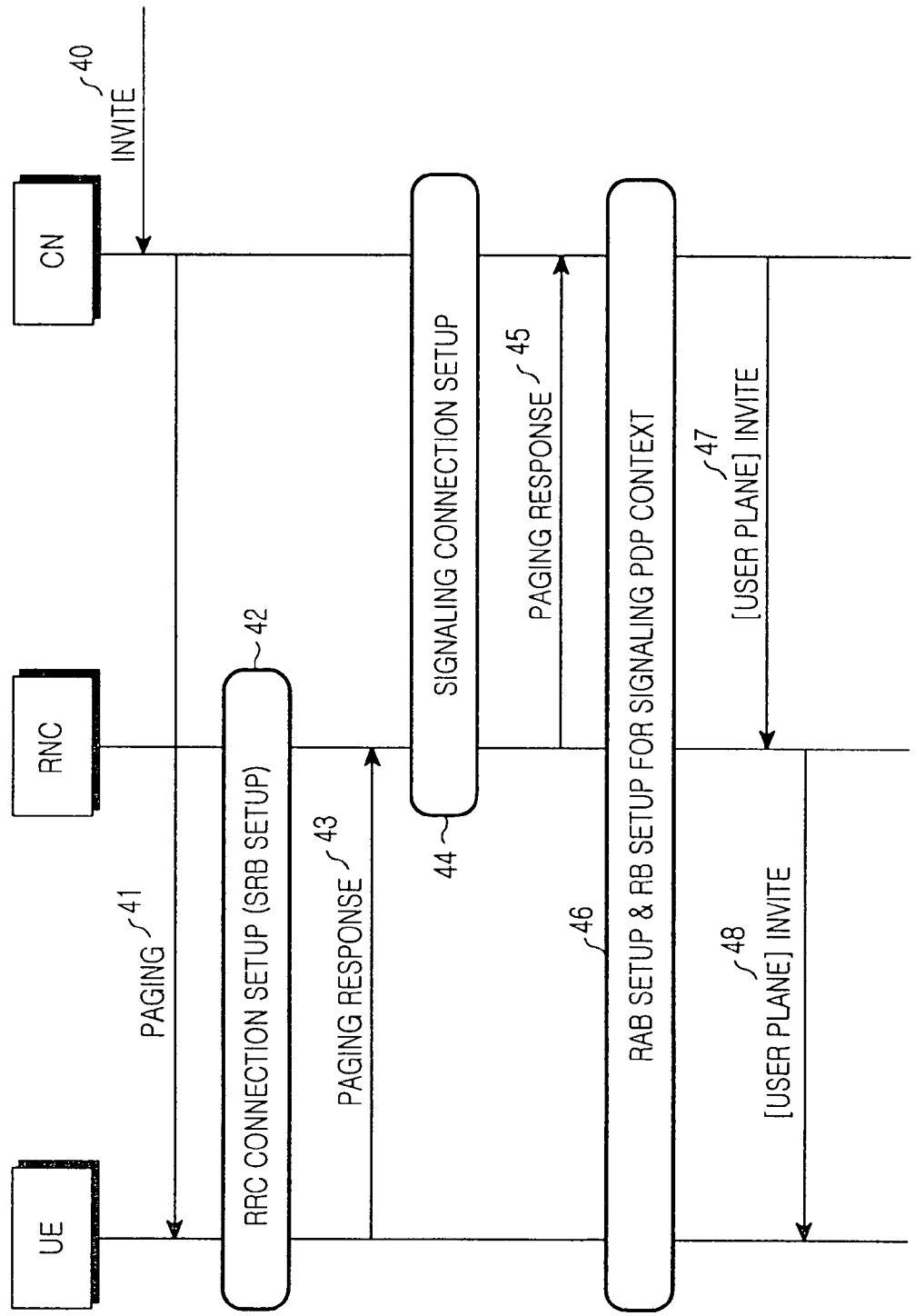
FIG. 4 illustrates a packet-switched call setup procedure.
Figure 5:
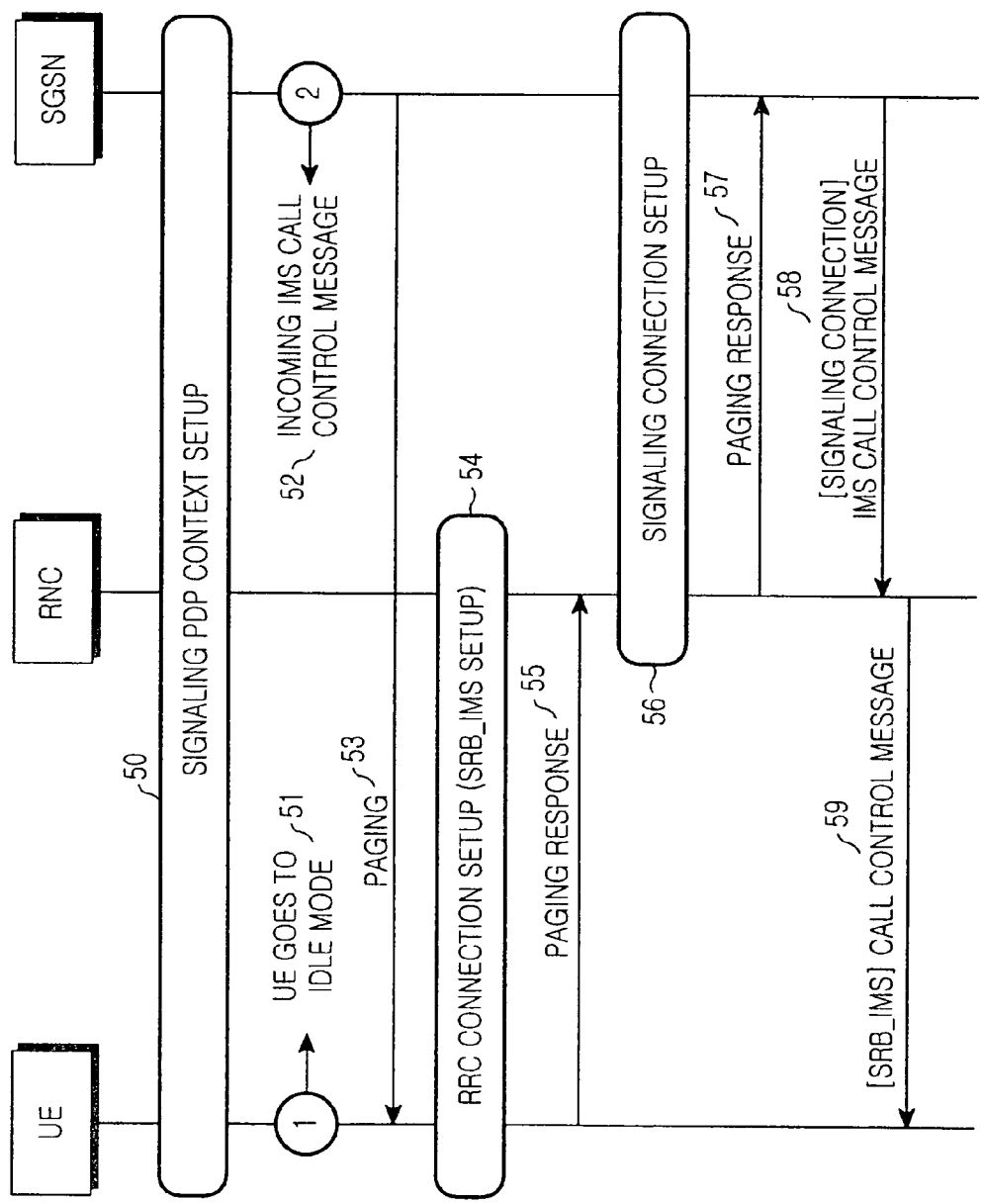
FIG. 5 illustrates a call setup procedure according to an embodiment of the present invention.

FIG. 5 illustrates a call setup procedure according to an embodiment of the present invention.

Referring to FIG. 5, the UE establishes a signaling PDP context with the SGSN in step 50.

The signaling PDP context contains control information and parameters required for transmission/reception of an IMS control message. Prior to reception of the IMS service, the UE establishes the signaling PDP context.

In step 51, the UE performs IMS registration using the signaling PDP context and transitions to an idle mode. Although the SGSN still maintains the signaling PDP context after the UE transitions to the idle mode, radio resources established between the SGSN and the UE are all released.

The SGSN receives an IMS call control message for the UE in step 52 and pages the UE in the idle mode in step 53. In step 54, the UE establishes an RRC connection with the RNC. At the same time, the UE requests an SRB_IMS setup to the RNC. When the SRB_IMS setup is completed, the UE transmits a PAGING RESPONSE message to the RNC in step 55. The RNC establishes a signaling connection with the SGSN in step 56 and transmits the PAGING RESPONSE message to the SGSN via the signaling connection in step 57.

In step 58, the SGSN transmits the IMS call control message received in step 52 to the RNC via the signaling connection. The RNC transmits the IMS call control message to the UE via the established SRB_IMS in step 59.

In the above procedure, the IMS call control message is transmitted/received via the already established signaling connection and SRB_IMS according to the present invention.

A description will be made below of the configurations of the UE, RNC and SGSN, and the structures of a signaling PDP context and NAS messages being control messages exchanged for signaling connection, for the purpose of transmitting data to be delivered in an IMS control message on an IMS control plane.

Figure 6:
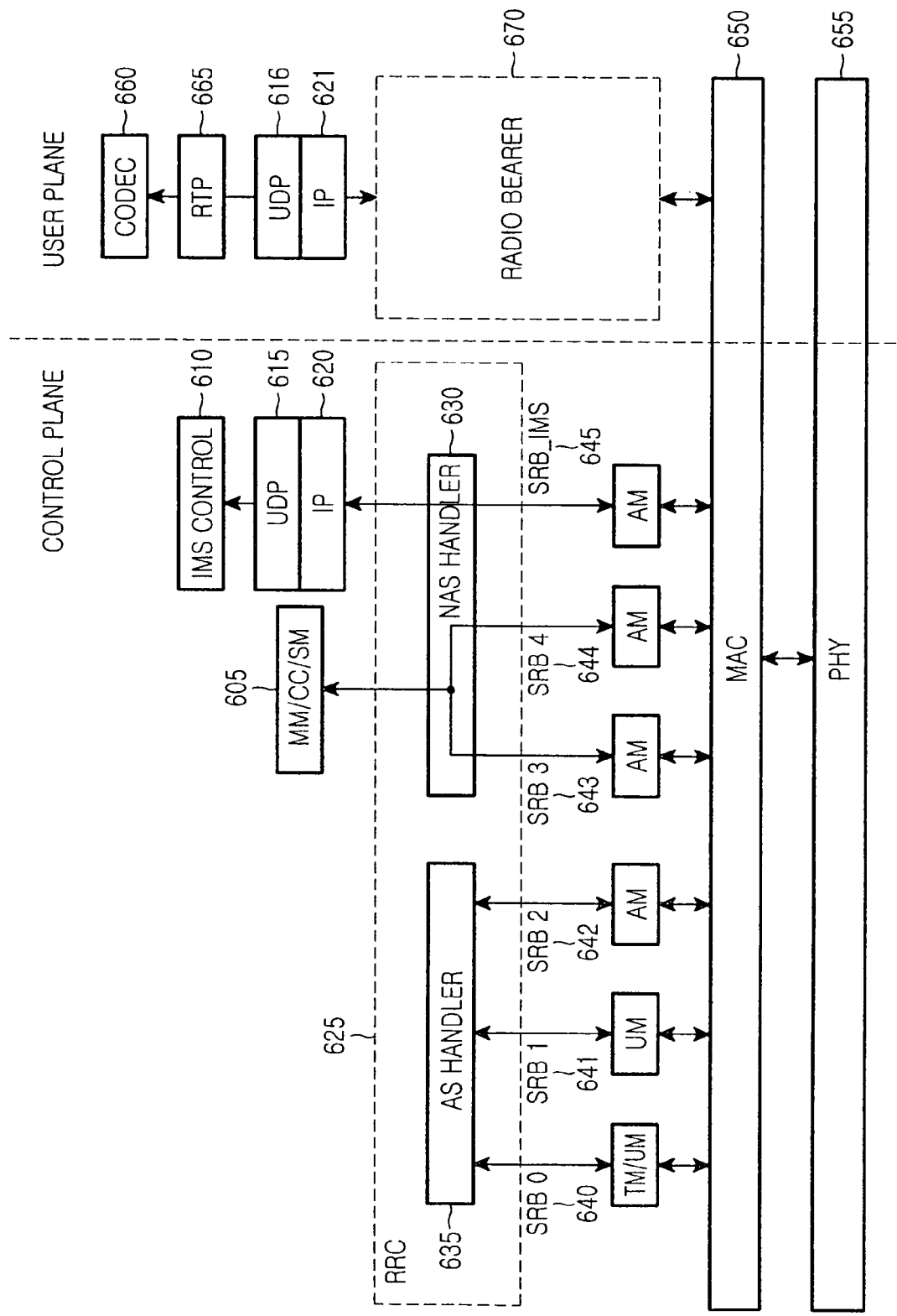
FIG. 6 illustrates an exemplary configuration of a UE according to the embodiment of the present invention.

FIG. 6 illustrates an exemplary configuration of the UE according to the embodiment of the present invention.

Referring to FIG. 6, interfaces for the UE are classified largely into a user plane for transmission/reception of user data and a control plane for transmission/reception of control information.

On the user plane, there are a CODEC 660, an RTP (Real-time Transport Protocol) layer 665, a UDP (User Datagram Protocol) layer 616, an IP layer 621, and a radio bearer 670. The configuration of the radio bearer 670 includes the PDCP layer and the RLC layer.

The control plane has an MM/CC/SM block 605, an RRC layer 625, SRB 0 to SRB_IMS 640 to 645, and an IMS controller 610. Particularly, a novel SRB, the SRB_IMS 645 is defined to process data generated from the IMS controller 610 in the embodiment of the present invention.

SRB 0 includes an RLC TM (Transparent Mode) layer for uplink processing and an RLC UM (Unacknowledged Mode) layer for downlink processing. SRB 1 has an RLC UM layer for both the downlink and uplink processing. SRB 2 includes an RLC AM (Acknowledged Mode) layer for both the downlink and uplink processing. SRB 2 to SRB_IMS each include an RLC AM layer for both the downlink and uplink processing.

SRB 0 is used for an initial message transmission such as an RRC connection setup request message. It is established all the time. Therefore, SRB 0 has no relation to an RRC connection setup procedure.

SRB 1 is established by an RRC connection setup. It transmits/receives an RRC message processed in the RRC in the RLC UM. SRB 3 and SRB 4 are established by the RRC connection setup. They transmit/receive RRC messages processed in the MM/CC/SM block 605 at the upper layer above the RRC. SRB 4 processes messages with a lower priority level than those processed in SRB 3.

The MM/CC/SM block 605 will be described in detail below.

The MM block supports the mobility of the UE. When the UE moves into a new area, the MM block reports the event to the MM block of the CN. The CC block processes a control message associated with a circuit-switched call. For instance, when the user presses a call button to place a call, the CC block generates a call setup message and sends it to the CC block of the CN.

The SM block is responsible for establishing and releasing a PDP context. That is, when the user wants to receive a packet service, the SM block sends a PDP connect setup message for the packet service to the SM block of the CN.

The IMS controller 610 is a layer that processes an IMS control message. The IMS controller 610 is virtually an SIP UA (User Agent) because it uses the SIP protocol for IMS control. If the user intends to set up a packet call like VoIP, the IMS controller 610 generates a call setup message such as INVITE and sends it to the network. It also receives an IMS control message from the network and performs a corresponding operation.

The RRC layer 625 includes an AS (Access Stratum) handler 635 and a NAS handler 630. The AS handler 635 generates RRC messages and provides them to their corresponding SRBs 640, 641 and 642. It also interprets RRC messages received through the SRBs 740, 741 and 742 and performs a corresponding operation. The protocol termination points of AS messages are the RRC entities of the UE and the RNC.

An RRC message generated from the AS handler 635 is provided to one of SRB 0, SRB 1, and SRB 2, processed in the SRB, and then sent on a radio channel through the MAC layer 650 and the PHY layer 655.

The NAS handler 630 provides a control message received from the MM/CC/SM block 605 or the IMS controller 610 to an appropriate SRB and sends a control message received through SRB 3, SRB 4, and SRB_IMS to an appropriate block.

The operation of the NAS handler 630 will be described in detail below.

The NAS handler 630 sends a control message generated from the MM/CC/SM block 605 to SRB 3 or SRB 4, and sends a message generated from the IMS controller 610 to SRB_IMS. It sends a message received from SRB 3 or SRB 4 to the MM/CC/SM block 605 and sends a message received from SRB_IMS to the IMS controller 610.

Figure 7:
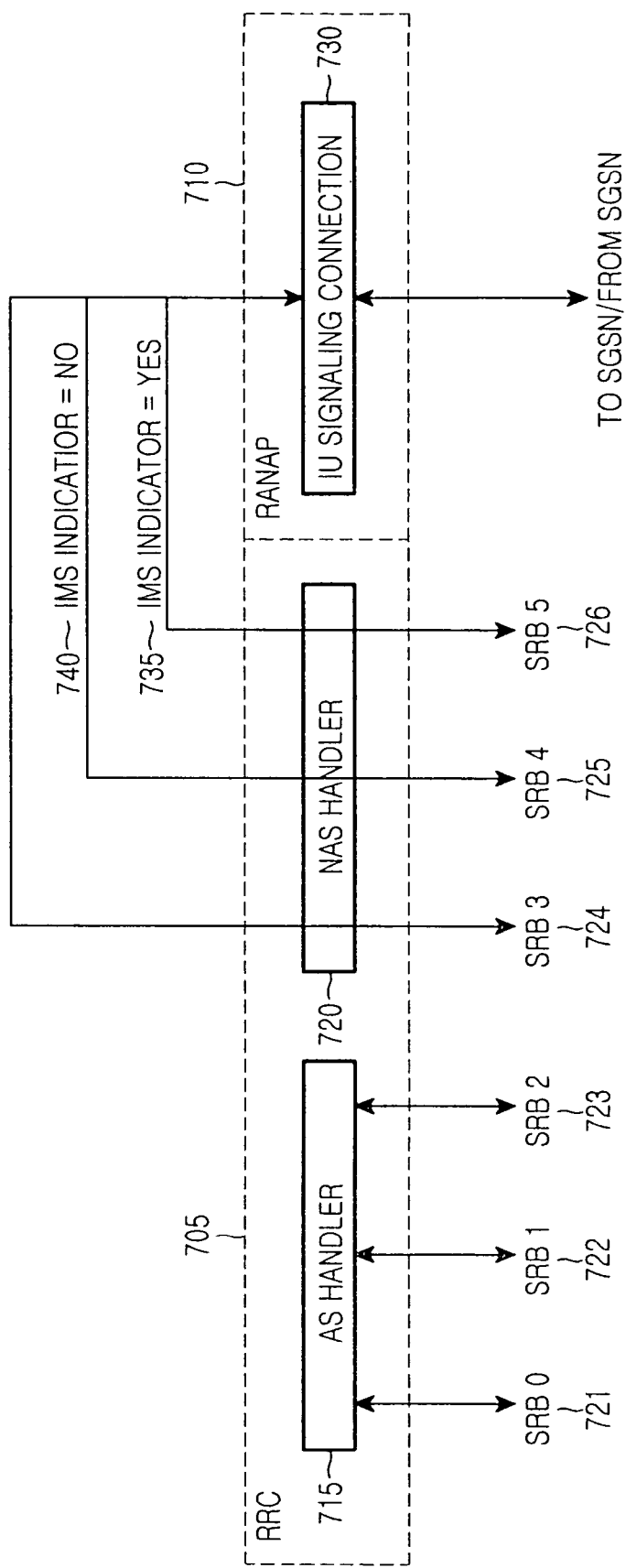
FIG. 7 illustrates the structure of a control plane in an RNC according to the embodiment of the present invention.

FIG. 7 illustrates the structure of a control plane in the RNC according to the embodiment of the present invention.

Referring to FIG. 7, the control plane of the RNC includes an RRC layer 705 and an RANAP (Radio Access Network Application Part) layer 710. The RRC layer 705 exchanges control messages with the UE and the RANAP layer 710 exchanges control messages with the CN. Control messages are exchanged through SRBs 821 to 826 on the Uu interface between the UE and the RNC. Control messages are exchanged through an Iu signaling connection 730 on the Iu interface between the RNC and the CN (or SGSN).

The RRC layer 705 interprets messages received through SRB 0, SRB 1 and SRB 2 and performs a corresponding operation. Thus, the RRC layer 705 is a termination point. On the other hand, since the termination point of messages transmitted through SRB 3 to SRB_IMS (524 to 726) is the CN (SGSN), the RRC layer 705 sends the messages to the RANAP layer 710.

A NAS handler 720 of the RRC layer 705 inserts an IMS indicator into a message received through SRB 3 to SRB_IMS (724 to 726). It sets the IMS indicator to NO in a message received through SRB 3 or SRB 4, and to YES in a message received through SRB_IMS.

Downlink NAS messages received in the RANAP layer 710 are provided to the NAS handler 720 of the RRC layer 705. The NAS handler 720 checks the IMS indicators of the messages and provides them to corresponding SRBs. If an IMS indicator is NO, the NAS handler 720 sends it to SRB 3 or SRB 4. If the IMS indicator is YES, the NAS handler 720 sends it to SRB_IMS.

The Iu signaling connection 730 is used to transmit/receive an RANAP message on the Iu interface. A UE that has established an RRC connection establishes the Iu signaling connection 730 by sending the first NAS message. The Iu signaling connection 730 is established or released by SCCP (Signaling Connection Control Protocol).

Figure 8:
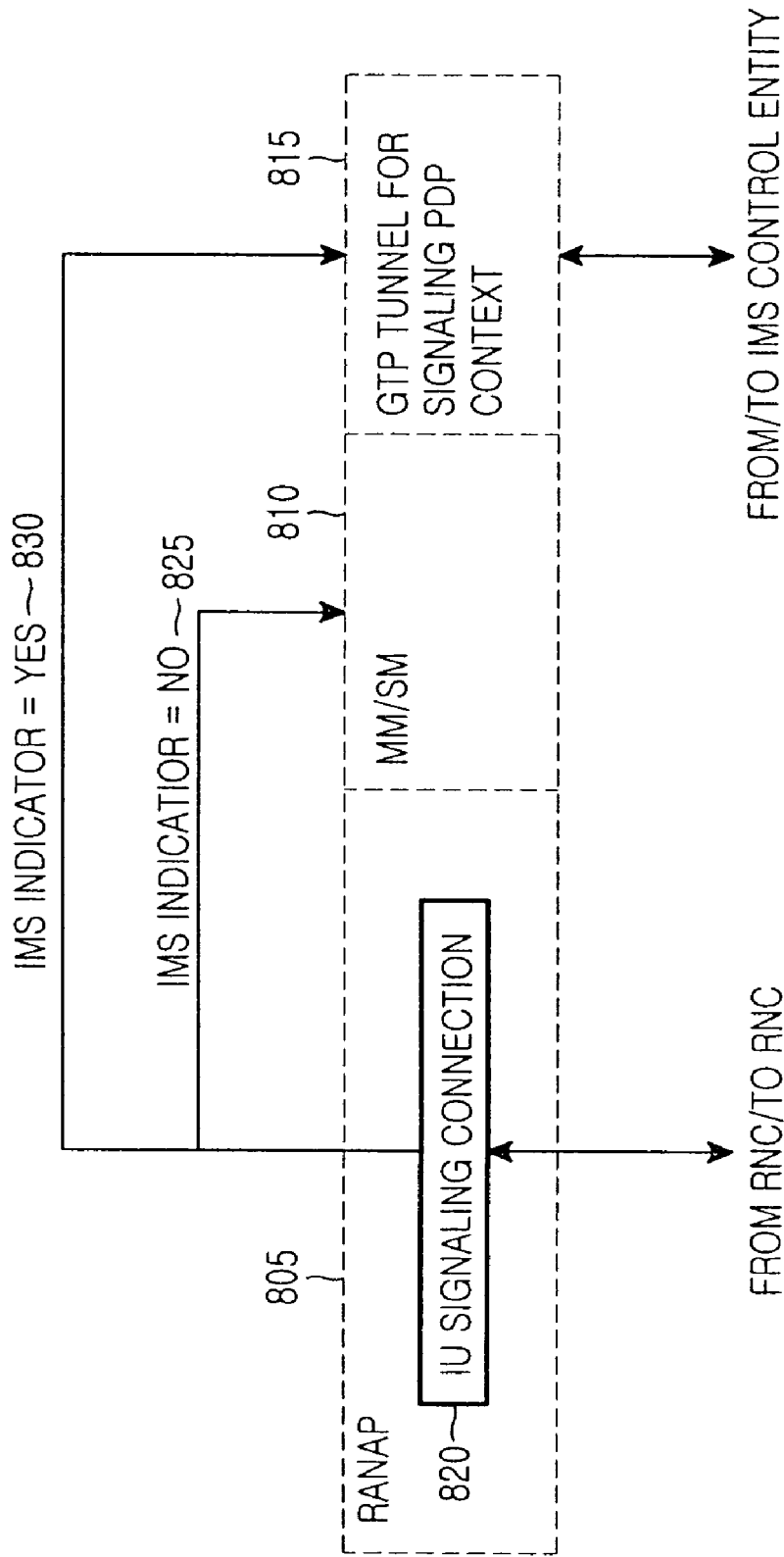
FIG. 8 illustrates the structure of a control plane in an SGSN according to the embodiment of the present invention.

FIG. 8 illustrates the structure of a control plane in the SGSN according to the embodiment of the present invention.

Referring to FIG. 8, the control plane of the SGSN includes an RANAP layer 805, an MM/SM layer 810, and a GTP (GPRS Tunneling Protocol-user) tunnel block 815 for a signaling PDP context.

Because the present invention applies only to the packet-switched domain, only components in the packet-switched domain of the CN are shown. For example, a CC block resides in the circuit-switched domain and thus it is not shown in FIG. 8.

The RANAP layer 805 interprets an IMS indicator in a control message received through an Iu signaling connection block 820 and provides the control message to a corresponding block.

That is, if the IMS indicator is NO, the RANAP layer 805 sends the control message to the MM/SM block 810. If the IMS indicator is YES, the RANAP layer 805 sends the control message to the GTP tunnel block 815. The GTP tunnel block 815 transmits/receives user data associated with a specific PDP context between the SGSN and the GGSN. One GTP tunnel block 815 is configured for each PDP context and sends data corresponding to the PDP context to the GGSN, ensuring QoS (Quality of Service) indicated in the PDP context.

When a signaling PDP context is established between the UE and the SGSN in a call setup procedure, a GTP tunnel for the PDP context is established between the SGSN and the GGSN. An IMS control message is sent to the GGSN through the GTP tunnel, and the GGSN sends the IMS control message to an IMS control node in the network.

The IMS control node performs an operation corresponding to the IMS control message. In a 3GPP system, a CSCF (Call Session Control Function) serves as the IMS control node.

An IMS control message sent by the IMS control node arrives as the FTP tunnel block 815 of the SGSN through the GTP tunnel. This message is provided to the RANAP layer 805. The RANAP layer 805 sets an IMS indicator for the message to YES and sends it to the RNC via the Iu signaling connection 820.

Upon generation of an MM/SM message, the MM/SM block 810 sends the message to the RANAP layer 810. The RANAP layer 810 sets an IMS indicator for the message to NO and sends it to the RNC via the Iu signaling connection 820.

As described above, the SGSN sets an IMS indicator or interprets a set IMS indicator and sends a message to a corresponding block.

Figure 9:
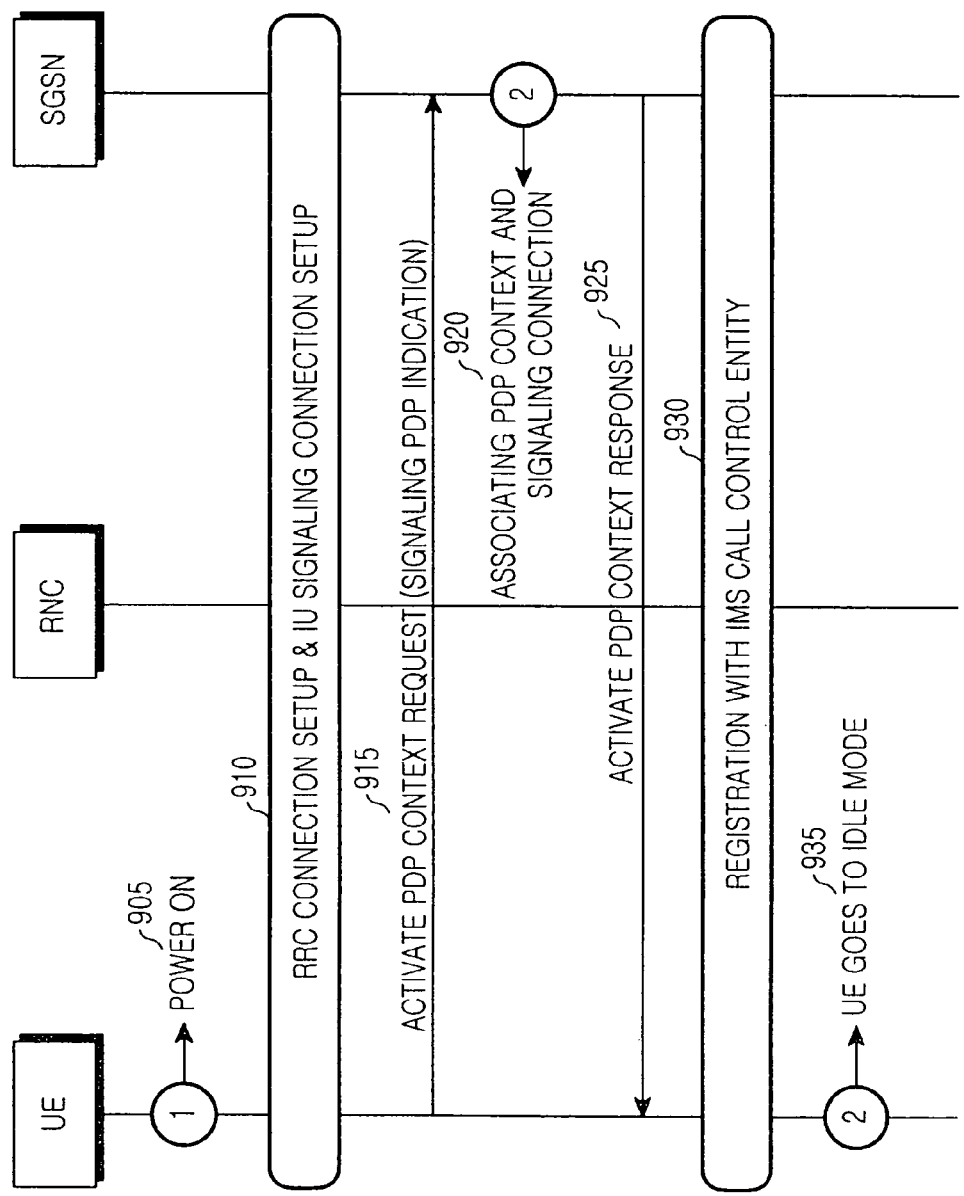
FIG. 9 illustrates an operation for establishing a signaling PDP context in the UE according to the embodiment of the present invention.

FIG. 9 illustrates an operation for establishing a signaling PDP context in the UE according to the embodiment of the present invention.

Referring to FIG. 9, when the IMS service-enabled UE is power-on in step 905, it establishes an RRC connection with the RNC and an Iu signaling connection with the SGSN in step 910.

In step 915, the UE sends an ACTIVE PDP CONTEXT REQUEST message to the SGSN via the RRC connection, and the Iu signaling connection in order to establish a signaling PDP context for transmission/reception of IMS control messages. The ACTIVE PDP CONTEXT REQUEST message contains signaling PDP context indication information. The SGSN establishes a GTP tunnel with the GGSN and associates the GTP tunnel with the Iu signaling connection in step 920.

In step 925, the SGSN notifies the UE of a successful signaling PDP context setup by sending an ACTIVE PDP CONTEXT RESPONSE message. The UE then performs a registration to the IMS control node in step 930.

The registration is the process of registering information about the location of the UE to the IMS control node so that the IMS control node can process an IMS call. The IMS control node then transfers an incoming signal for the UE to the registered location.

After steps 905 to 930, the UE transitions to an idle mode in step 935.

In the above signaling PDP context setup procedure, the SGSN finds out that the current PDP context the UE establishes is a signaling PDP context, and sends a NAS message with an IMS indicator set to "YES" among NAS messages received via the Iu signaling connection through a GTP tunnel indicated by the signaling PDP context.

The UE generates the signaling PDP context containing information about the GTP tunnel and the Iu signaling connection. Then, a control message received through the Iu signaling connection is sent through the GTP tunnel, and a control message received through the GTP tunnel is sent via the Iu signaling connection.

Figure 10:
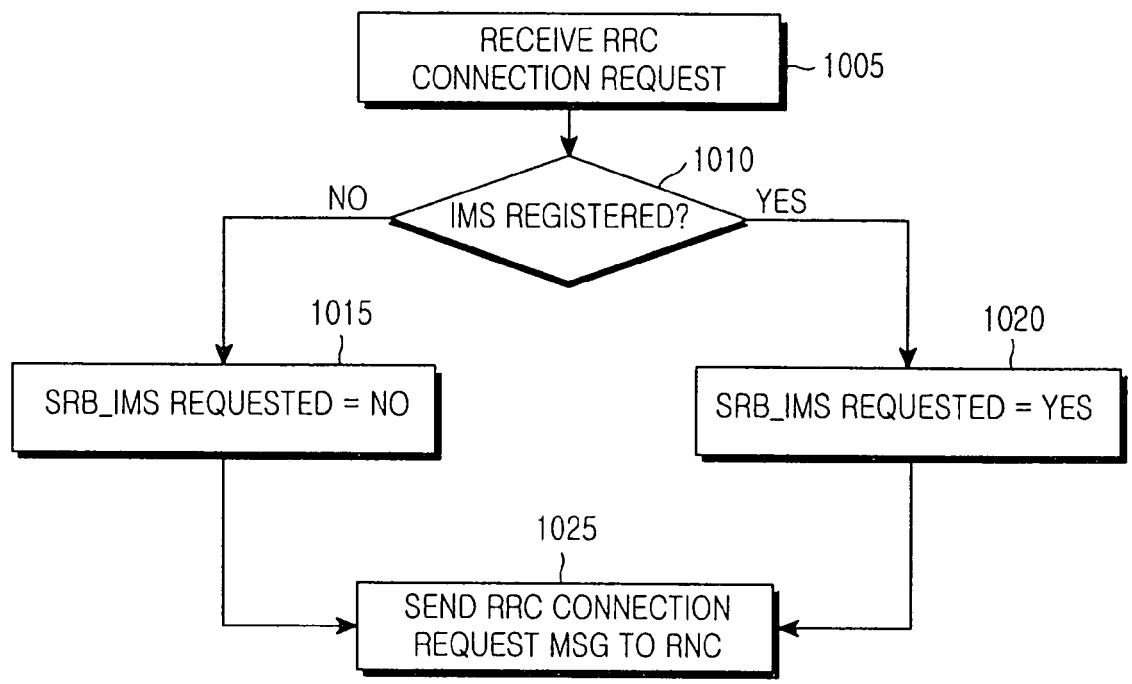
FIG. 10 is a flowchart illustrating an operation for requesting SRB_IMS setup in the UE, when transmitting an RRC CONNECTION REQUEST message according to the embodiment of the present invention.

FIG. 10 is a flowchart illustrating an operation for requesting SRB_IMS setup in the UE, when transmitting an RRC CONNECTION REQUEST message according to the embodiment of the present invention.

Referring to FIG. 10, an RRC CONNECTION REQUEST message is generated in the RRC layer of the UE in step 1005.

In the case where the UE in the idle state needs to exchange control signals with the network, the RRC CONNECTION REQUEST message is generated. For example, upon receipt of a PAGING message in the idle mode, the UE must set up an RRC connection. To do so, the UE sends the RRC CONNECTION REQUEST message.

In step 1010, the UE determines whether it has registered to the IMS service. If it has not, the UE sets a parameter "SRB_IMS requested" to "NO" in step 1015 and proceeds to step 1025. In step 1025, the UE sends the RRC CONNECTION REQUEST message with the parameter to the RNC.

If it has registered to the IMS service, the UE sets the parameter "SRB_IMS requested" to "YES" in step 1020 and sends the RRC CONNECTION REQUEST message with the parameter to the RNC in step 1025.

If the UE has already established a signaling PDP context with the SGSN and thus can exchange IMS control messages at any time, the UE is then in the IMS service registered state. Therefore, the UE sets up SRB_IMS in response to paging from the SGSN.

Upon receipt of the RRC CONNECTION REQUEST message, the RRC checks the SRB_IMS requested parameter. If the parameter is YES, the RNC sets up SRB_IMS also when setting up SRBs for the UE. In this case, the RNC can allocate more radio resources to the UE than when SRB_IMS is not set up.

Figure 11:
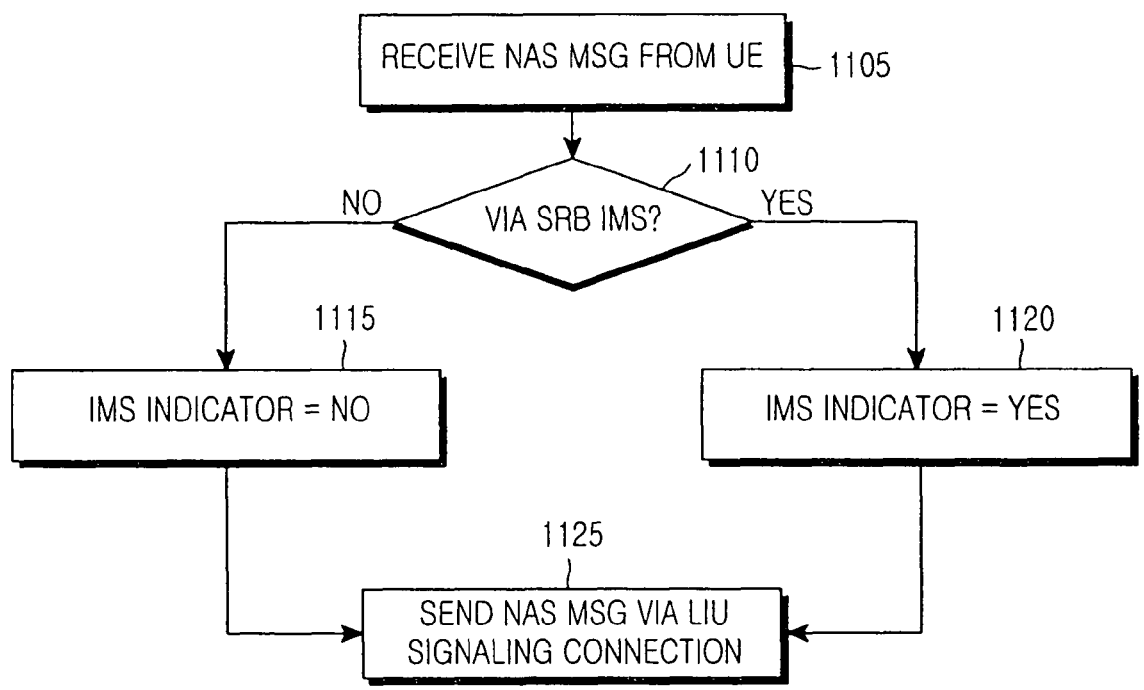
FIG. 11 is a flowchart illustrating the operation of the RNC, upon receipt of a NAS message from the UE according to the embodiment of the present invention.

FIG. 11 is a flowchart illustrating the operation of the RNC, upon receipt of a NAS message from the UE according to the embodiment of the present invention.

Referring to FIG. 11, the RNC receives a NAS message from the UE in step 1105 and determines whether the NAS message has been received through SRB_IMS in step 1110.

If the NAS message has not been from SRB_IMS, the RNC attaches an IMS indicator set to NO to the NAS message in step 1115 and proceeds to step 1125. If the NAS message has been from SRB_IMS, the RNC attaches an IMS indicator set to YES to the NAS message in step 1120 and proceeds to step 1125.

In step 1125, the RNC sends the NAS message with the IMS indicator to the SGSN via the Iu signaling connection.

As described above, the RNC sets an IMS indicator to an appropriate value based on the type of an SRB through which an uplink NAS message has been received.

Figure 12:
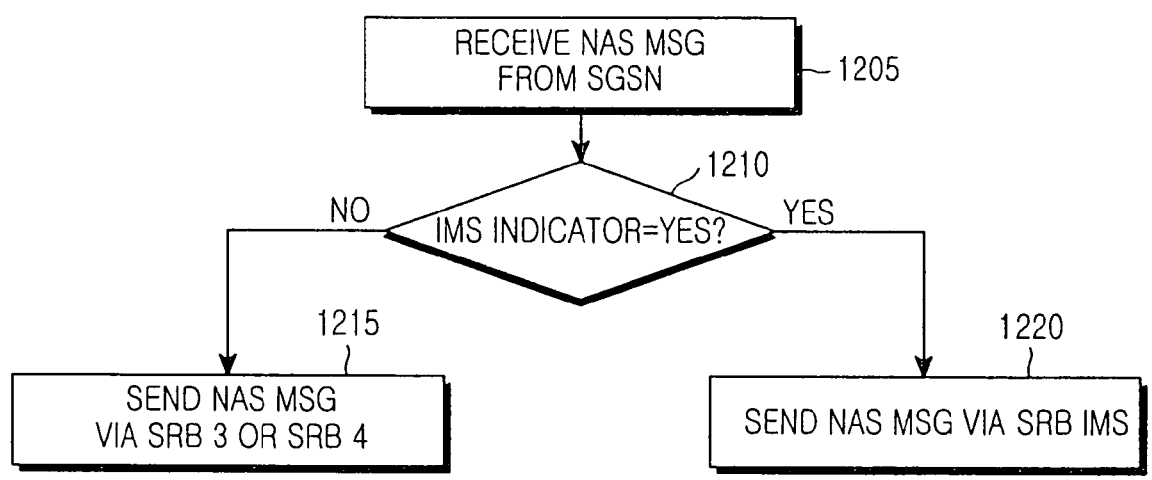
FIG. 12 is a flowchart illustrating the operation of the RNC, upon receipt of a NAS message from the SGSN according to the embodiment of the present invention.

FIG. 12 is a flowchart illustrating the operation of the RNC, upon receipt of a NAS message from the SGSN according to the embodiment of the present invention.

Referring to FIG. 12, upon receipt of a NAS message from the SGSN in step 1205, the RNC checks the IMS indicator of the NAS message in step 1210. If the IMS indicator is NO, the RNC proceeds to step 1215, considering that the NAS message has been generated from the MM/SM block. In step 1215, the RNC sends the NAS message through SRB 3 or SRB 4. If the IMS indicator is YES, the RNC goes to step 1220, considering that the NAS message is an IMS control message. In step 1220, the RNC sends the NAS message through SRB_IMS.

Figure 13:
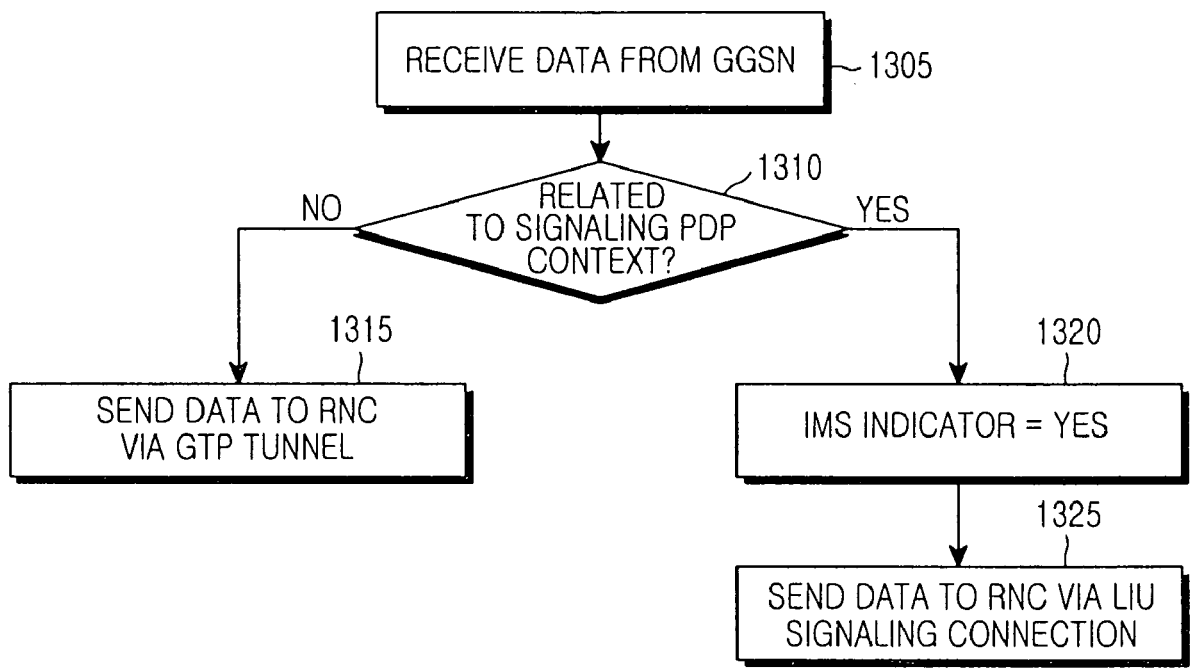
FIG. 13 is a flowchart illustrating the operation of the SGSN, upon receipt of packet data from a GGSN according to the embodiment of the present invention.

FIG. 13 is a flowchart illustrating the operation of the SGSN, upon receipt of packet data from the GGSN according to the embodiment of the present invention.

Referring to FIG. 13, upon receipt of packet data from the GGSN through the GTP tunnel in step 1305, the SGSN determines whether the GTP tunnel has been set in the signaling PDP context in step 1310.

If the signaling PDP context does not indicate the GTP tunnel, the SGSN proceeds to step 1315, considering that the packet data is user data. In step 1315, the SGSN determines an Iu interface connection through which to send the packet data according to a typical routing operation through the GTP tunnel, and sends the packet data to the RNC via the connection.

If the signaling PDP context indicates the GTP tunnel, the SGSN proceeds to step 1320, considering that the packet data is an IMS control message. The SGSN attaches an IMS indicator set to YES to the packet data in step 1320 and sends the packet data with the IMS indicator to the RNC via the Iu signaling connection in step 1325.

Figure 14:
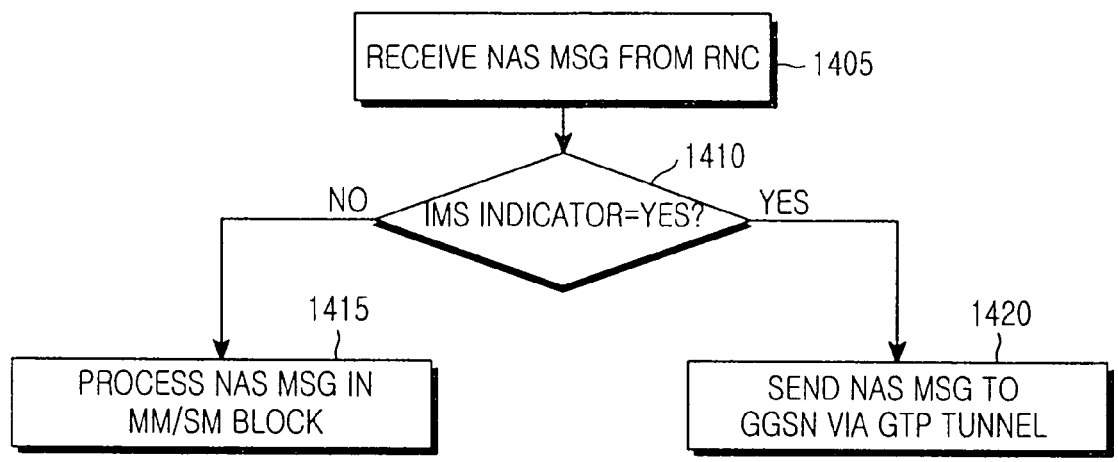
FIG. 14 is a flowchart illustrating the operation of the SGSN, upon receipt of a NAS message from the RNC via an Iu signaling connection according to the embodiment of the present invention.

FIG. 14 is a flowchart illustrating the operation of the SGSN, upon receipt of a NAS message from the RNC via the Iu signaling connection according to the embodiment of the present invention.

Referring to FIG. 14, upon receipt of a NAS message via the Iu signaling connection from the RNC in step 1405, the SGSN checks the IMS indicator of the message in step 1410.

If the IMS indicator is NO, which implies that the NAS message is not an IMS control message, the SGSN sends the received data to the MM/SM block in step 1415. On the contrary, if the IMS indicator is YES, which implies that the NAS message is an IMS control message, the SGSN sends the NAS message to the GGSN via a GTP tunnel indicated by the signaling PDP context in step 1420.

In accordance with the embodiment of the present invention as described above, the SGSN has knowledge of a signaling PDP context among its preserved PDP contexts. Therefore, upon receipt of an IMS control message via an Iu signaling connection, the SGSN can determine from the signaling PDP context which GTP tunnel the IMS control message must be sent.

<<Second Embodiment>>

Hereinbelow, a description will be made of a method of transmitting an IMS control message in the UE according to another embodiment of the present invention.

In accordance with this embodiment, information indicating a GTP tunnel to transmit an IMS control message through is included in a NAS message containing the IMS control message. The SGSN routes the IMS control message based on the information. The GTP tunnel indicating information is an NSAPI (Network Service Access Point Identification), for example. The NSAPI identifies a PDP context between the UE and the SGSN. It is meaningful to the UE only. That is, a PDP context identified by NSAPI 1 for UE 1 and a PDP context identified by NSAPI 2 for UE 2 are different.

Figure 15:
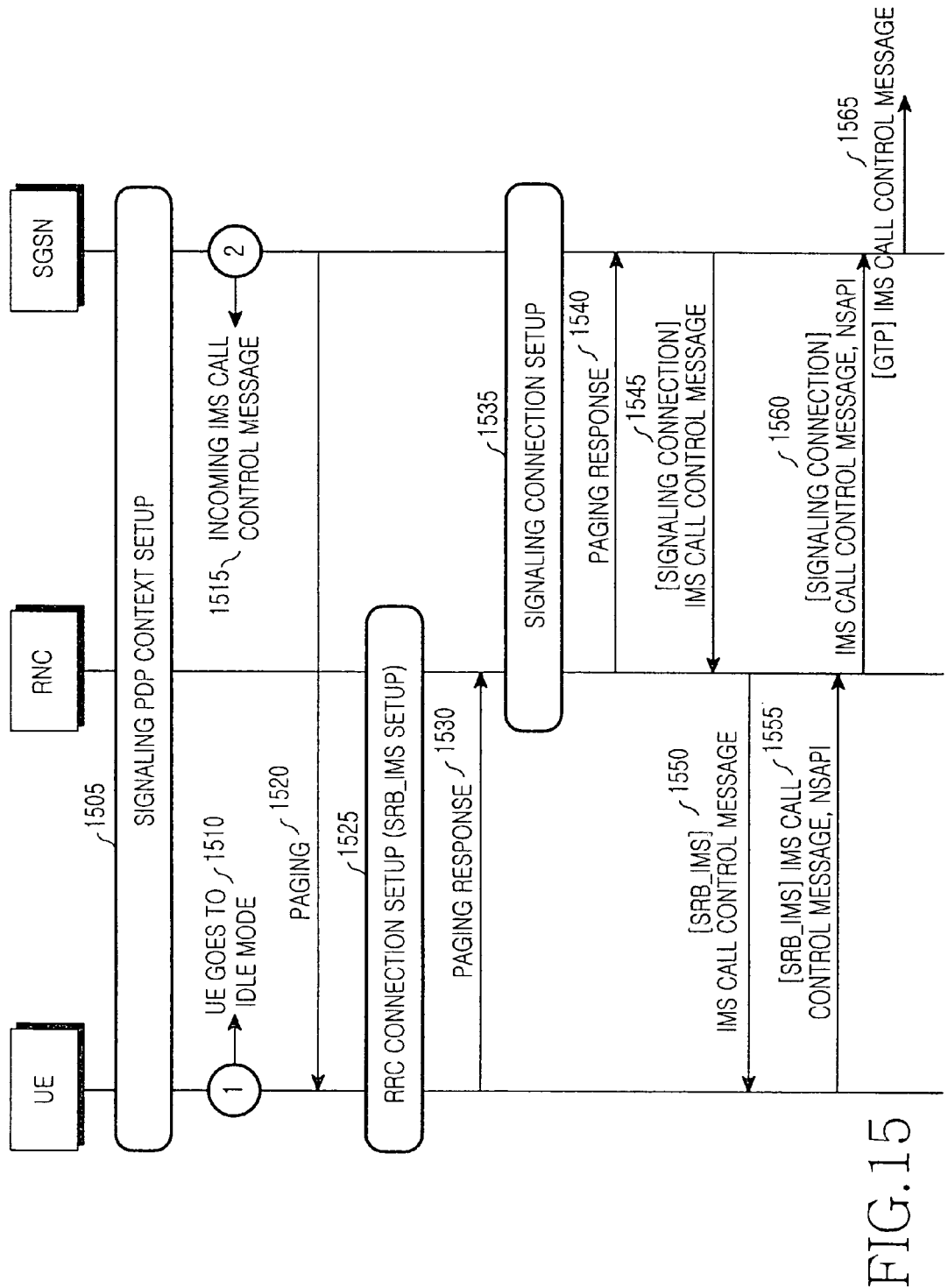
FIG. 15 illustrates a call setup procedure for the UE according to another embodiment of the present invention.

FIG. 15 illustrates a call setup procedure for the UE according to another embodiment of the present invention.

Referring to FIG. 15, the UE establishes a signaling PDP context with the SGSN and performs an IMS registration using the signaling PDP context in step 1505.

In step 1510, the UE transitions to an idle mode. In the idle mode, the signaling PDP context is still kept in the SGSN, but radio resources between the SGSN and the UE are released.

Upon receipt of an IMS call control message in step 1515, the SGSN sends a PAGING message to the UE in the idle mode in step 1520.

The UE then establishes an RRC connection with the RNC in step 1525. At the same time, the UE tells the RNC that an SRB_IMS setup is needed, and the RNC sets up an SRB_IMS when setting up the RRC connection. In step 1530, the UE sends a PAGING RESPONSE message to the RNC.

In step 1535, the RNC establishes an Iu signaling connection with the SGSN. The RNC sends the PAGING RESPONSE message to the SGSN via the Iu signaling connection in step 1540.

In step 1545, the SGSN sends an IMS call control message to the RNC via the Iu signaling connection. The RNC sends the IMS call control message to the UE via the SRB_IMS in step 1550.

The UE sends a response message for the IMS call control message to the RNC in step 1555. At the same time, the UE sends the NSAPI of a GTP tunnel through which the response message is to be sent to the RNC via the SRB_IMS. In step 1560, the RNC sends a message including the NASPI received through the SRB_IMS to the SGSN via the Iu signaling connection.

The SGSN receives the IMS control message including the NASPI from the RNC via the Iu signaling connection and sends the IMS control message through the GTP tunnel indicated by the NSAPI in step 1565.

<<Third Embodiment>>

The 3GPP is now standardizing PoC (Push to talk over Cellular) service. The POC service is transmission/reception of voice data among a plurality of UEs under control of a PoC server. Only one UE can send voice data at a given time. Therefore, if a plurality of users want to send voice data at a particular time, which user to send voice data is decided under the control of the PoC server. That is, the UE requests transmission of voice data to the PoC server and the PoC server allows a specific UE to send voice data. Control messages for transmission request and request acceptance are exchanged through a companion RTCP of the RTP in which the voice data is generated.

Typically, RTCP packets are transmitted/received on the user plane. When the UE intends to send a transmission request RTCP packet, the user plane may not be established. If the UE first establishes the user plane and then sends the RTCP packet, a time delay that the user experiences may be too long.

In this context, a need exists for a method of fast transmitting/receiving an RTCP message containing PoC control information as well as an SIP message being an example of an IMS control message in the first and second embodiments.

A third embodiment of the present invention provides another technique for rapidly transmitting an IMS control message such as the RTCP message.

In accordance with the third embodiment, a NAS message targeting to send an IMS control message is defined, and an IMS control message requiring fast transmission/reception is transmitted/received using the NAS message. Since the NAS message is sent through SRB 3 or SRB 4 of an RC connection, there is no need for pre-defining a user plane for transmission/reception of IMS control messages.

A brief overview of RTP and RTCP will be given below.

RTP is a protocol designed to send real-time data like voice data. According to the RTP, a header contains timing information about data generation. A receiver decides a reproduction time for the received data based on the timing information. The RTP can be configured together with a companion RTCP. The RTCP delivers additional information about an RTP session or a user. Since the RTP and RTCP are identified by UDP port numbers, strictly speaking, they are different flows. Hence, they are serviced using separate PDP contexts. However, the amount of RTCP data is very small, compared to RTP data. Thus, the RTP and RTCP are sometimes serviced in one PDP context.

Figure 16:
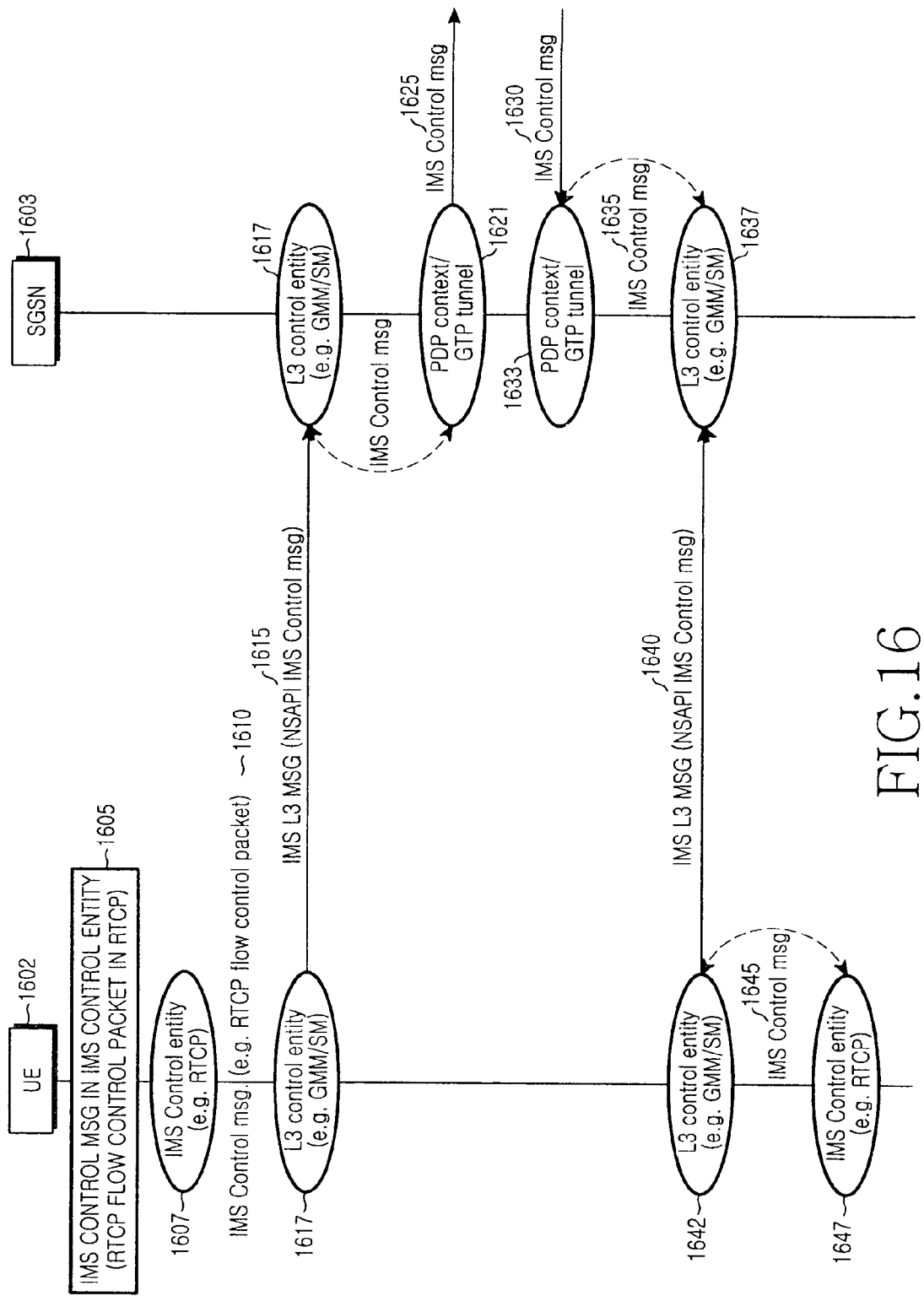
FIG. 16 illustrates an overall operation between the UE and the SGSN according to a third embodiment of the present invention.

FIG. 16 illustrates an overall operation between the UE and the SGSN according to the third embodiment of the present invention.

Referring to FIG. 16, this operation takes place between a UE 1602 and an SGSN 1603 and is applicable to both the downlink and the uplink. A description of the operation on the uplink will first be made.

An IMS control message 1605 is generated in the IMS control entity of the UE 1602 at an arbitrary time. The IMS control message can be an SIP message, or a PoC control message sent by the RTCP.

The IMS control entity like the RTCP sends the IMS control message 1610 to a L3 control entity 1617. The L3 control entity 1617 is a layer that processes NAS messages. A GMM (GPRS Mobility Management) layer or an SM (Session Management) layer can serve as the L3 control entity.

The L3 control entity 1617 sends an L3 message 1615 with the IMS control message 1610 to the SGSN. The L3 message is a typical L3 control message containing an IMS control message. One of conventional L3 control messages is used or a new L3 control message can be defined. In the following description, it is assumed for convenience' sake that a new L3 control message is defined. This new L3 control message is called an IMS L3 control message 1615.

The IMS L3 control message 1615 may further include the NSAPI of a PDP context associated with an entity that has generated the IMS control message, in addition to the IMS control message. For example, if the IMS control message is an SIP message, the NSAPI is that of a signaling PDP context. If the IMS control message is an RTCP packet, the NSAPI is that of a PDP context configured for an RTCP flow.

Upon receipt of the IMS L3 control message 1615, an L3 control entity 1619 of the SGSN sends the IMS control message 1620 of the IMS L3 control message 1615 to a GTP tunnel 1621 for a PDP context, indicated by the NSAPI.

The IMS control message 1625 will be sent to a destination through the GTP tunnel based on the IP destination address of an IP header.

The downlink operation depicted in FIG. 16 is performed basically in the same manner as the uplink operation.

Upon receipt of an IMS control message 1635 through a GTP tunnel at an arbitrary time, a GTP tunnel 1633 sends the IMS control message 1635 to the L3 control entity 1637 of the SGSN.

The L3 control entity 1637 sends the IMS control message 1635 and an IMS L3 control message 1640 containing the NSAPI of the GTP tunnel 1633 to the UE.

The L3 control entity 1642 of the UE sends the IMS control message 1645 to an entity 1647 indicated by the NSAPI of the IMS Le control message 1640. The entity 1647 is an SIP client or an RTCP entity for processing PoC control information.

Figure 17:
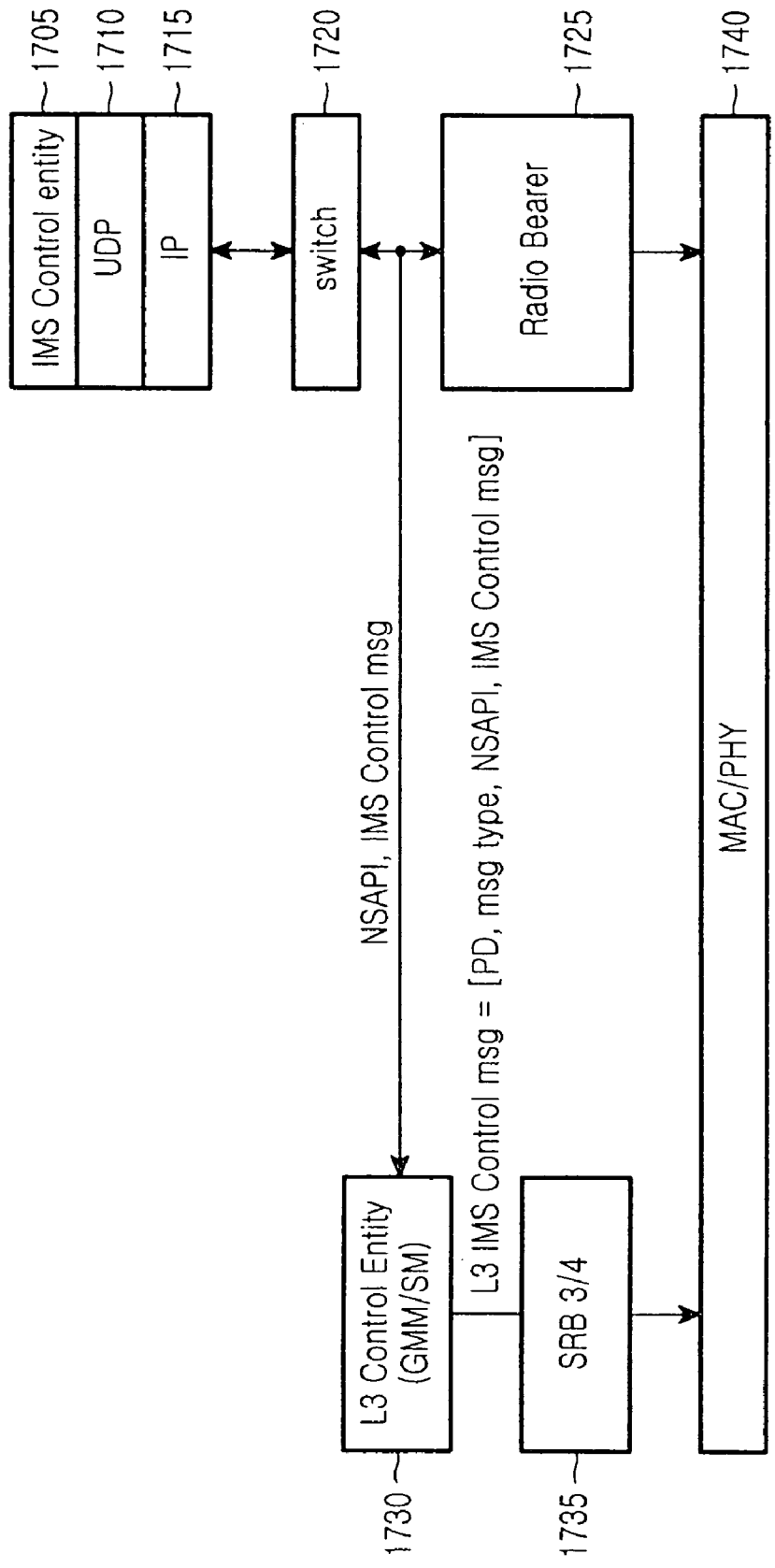
FIG. 17 illustrates the uplink structure of the UE according to the third embodiment of the present invention.

FIG. 17 illustrates the uplink structure of the UE according to the third embodiment of the present invention.

Referring to FIG. 17, the UE is configured to include an IMS controller 1705, a UDP layer 1710, an IP layer 1715, a switch 1720, a radio bearer 1725 established for processing data generated from the IMS controller 1705, an L3 control entity 1730, SRB 3/4 1735, and a MAC/PHY layer 1740.

The IMS controller 1705 can be an SIP client or an RTCP for processing PoC control information.

The UDP layer 1710 and the IP layer 1720 attach a UDP header and an IP header to data received from an upper layer.

The switch 1720 switches the data from the upper layer to an appropriate device. That is, if the received data is an IMS control message and a user plane needs to be established for transmission of the IMS control message, the switch 720 switches the IMS control message to the L3 control entity 1730. The NSAPI of a PDP context corresponding to the IMS control message is also provided together with the IMS control message.

The stepwise operation of the switch 1720 will be described below in detail.

In step 1, the switch 1720 receives data from the upper layer.

In step 2, the switch 1720 determines whether the received data is an IMS control message. If it is an IMS control message, the switch 1720 proceeds to step 4. Otherwise, that is, if it is user data, the switch 1720 goes to step 3.

In step 3, the switch 1720 sends the user data to the radio bearer 1725 for the PDP context corresponding to the user data, and waits until receiving the next data.

In step 4, the switch 1720 determines whether a radio bearer for a PDP context corresponding to the IMS control message exists. If it does, the switch 1729 goes to step 5 and otherwise, goes to step 6.

In step 5, since the user plane already exists to process the IMS control message, the switch 1720 sends the IMS control message to the radio bearer 1725 and waits until receiving the next data.

In step 6, since the user plane does not exist for processing the IMS control message, the switch 1720 sends the IMS control message to L3 control entity 1730. At the same time, the NSAPI of the PDP context corresponding to the IMS control message is sent. Then, the switch 1720 waits until receiving the next data.

The radio bearer 1725 refers to a PDCP entity and an RLC entity configured to process a specific data stream. Yet, the radio bearer 1725 is used to process user data in the illustrated case of FIG. 17.

The L3 control entity 1730 is an entity for processing an NAS message. For example, it is a GMM entity or an SM entity.

The L3 control entity 1730 generates an IMS L3 control message using the IMS control message and the NASPI received from the switch 1720.

The IMS L3 control message contains a PD (Protocol Discriminator), a Message Type, the NSAPI, and the IMS control message.

The PD identifies an L3 control entity for processing the IMS L3 control message. The Message Type identifies the IMS L3 control message. If a new IMS L3 control message is defined, the Message Type is set to a new defined value. The NSAPI is the identifier of the PDP context corresponding to the IMS control message. The SGSN determines which GTP tunnel to send the IMS control message through based on the NSAPI of the IMS L3 control message. The IMS control message is an actual message to be sent by the IMS L3 control message.

SRB 3/4 is a radio bearer established to process a NAS message, as described before.

Figure 18:
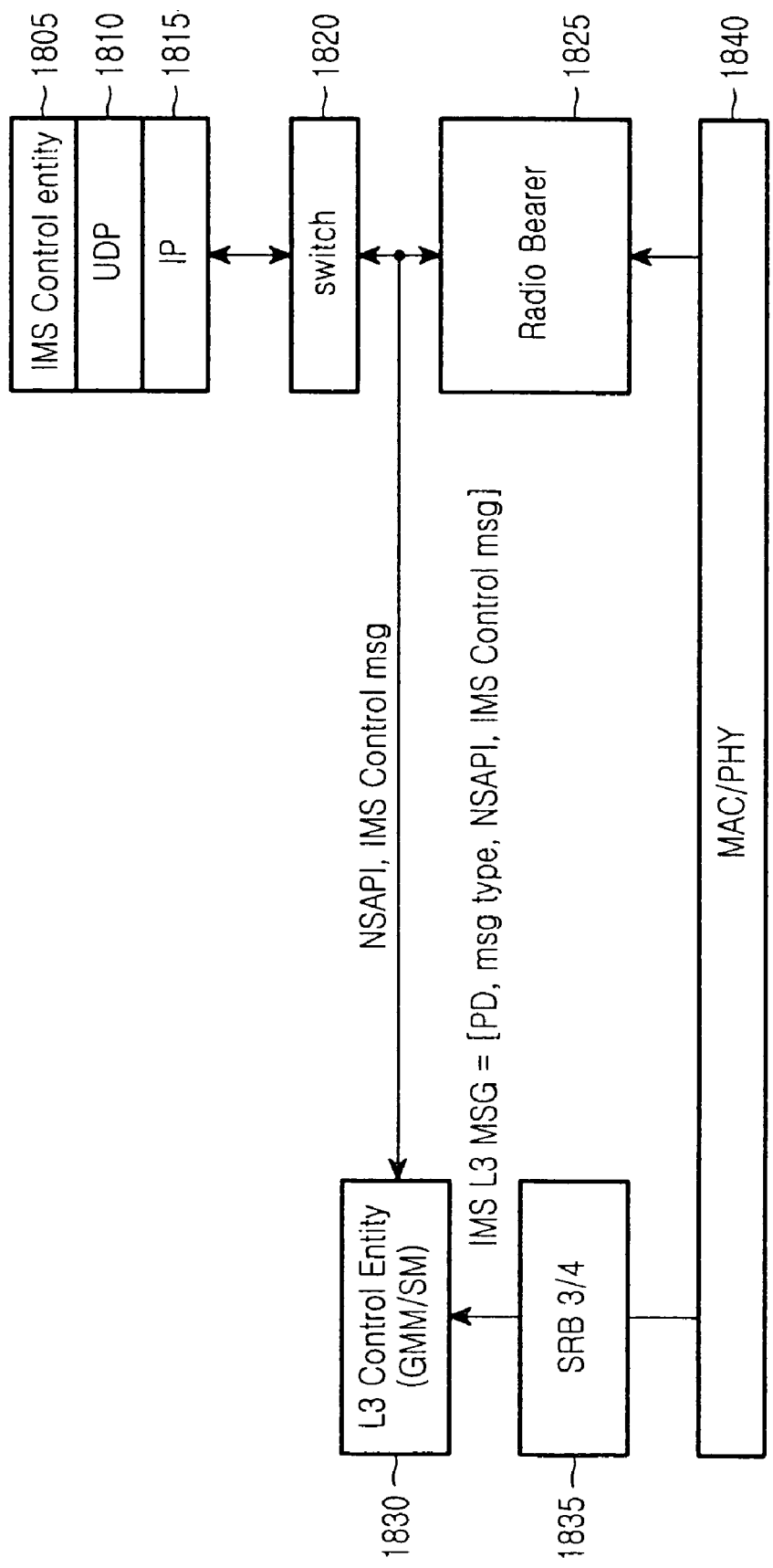
FIG. 18 illustrates the downlink structure of the UE according to the third embodiment of the present invention.

FIG. 18 illustrates the downlink structure of the UE according to the third embodiment of the present invention.

Referring to FIG. 18, the UE includes an IMS controller 1805, a UDP layer 1810, an IP layer 1815, a switch 1820, a radio bearer 1825 established for processing data generated from the IMS controller 1805, an L3 control entity 1830, SRB 3/4 1835, and a MAC/PHY layer 1840.

A NAS message received from SRB 3/4 is provided to the L3 control entity 1830. The L3 control entity 1830 finds out that the NAS message is an IMS L3 control message by interpreting the PD and Message Type of the NAS message and provides an NSAPI and the IMS control message to the switch 1820. Meanwhile, if the NAS message is not an IMS L3 control message, the L3 control entity 1930 processes the NAS message in the conventional manner.

The switch 1820 receives data from the radio bearer 1825 or the L3 control entity 1830 and switches the received data to an appropriate PDP context.

The operation of the switch 1820 will be detailed below.

In step 1, the switch 1820 receives data from the user-plane radio bearer 1825 or an NSAPI and an IMS control message from the L3 control entity 1830.

In the former case, the switch 1830 proceeds to step 2 and in the latter case, it goes to step 3.

In step 2, the switch 1820 provides the received data to an upper layer corresponding to a PDP context associated with the radio bearer and waits until receiving the next data.

In step 3, the switch 1820 provides the received IMS control message to an upper layer corresponding to a PDP context indicated by the NSAPI and waits until receiving the next data.

The IMS controller 1804 is a device that processes an IMS control message. It can be an SIP client or an RTCP for processing PoC control information.

Figure 19:
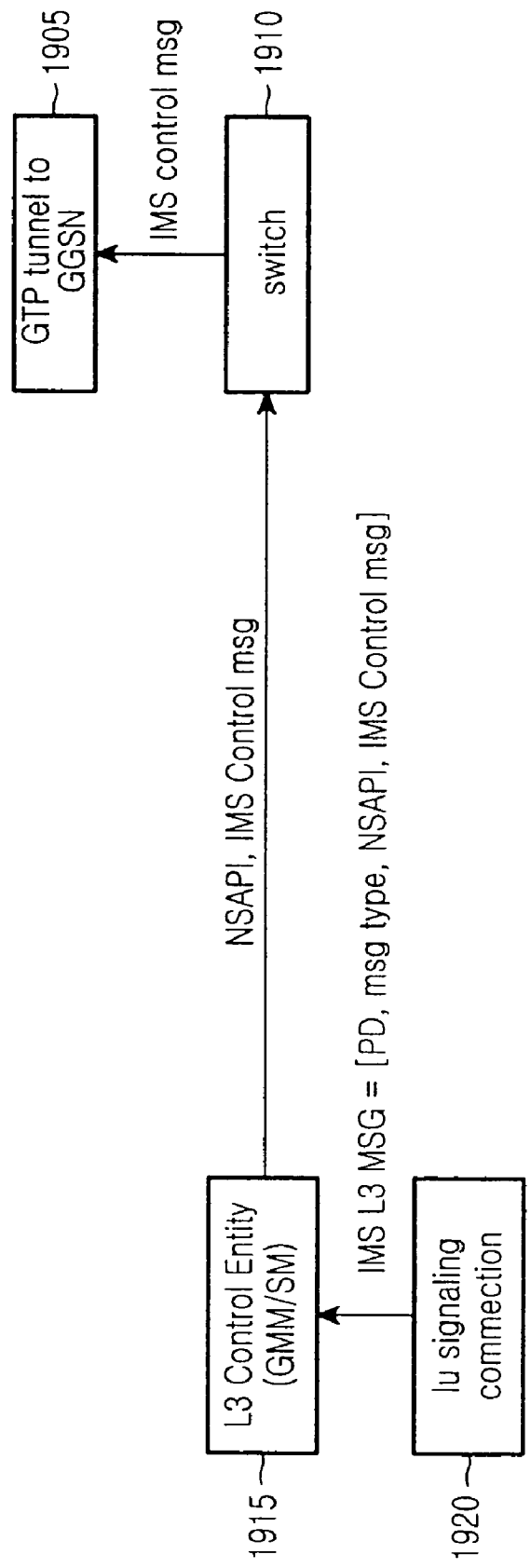
FIG. 19 illustrates the uplink structure of the SGSN according to the third embodiment of the present invention.

FIG. 19 illustrates the uplink structure of the SGSN according to the third embodiment of the present invention.

Referring to FIG. 19, the uplink configuration of the SGSN includes an Iu signaling connection 1920, an L3 control entity 1915, a switch 1910, and a GTP tunnel 1905.

Upon receipt of a NAS message through the Iu signaling connection 1920, the L3 control entity 1915 interprets the PD and Message Type of the NAS message. If the received NAS message is an L3 control message, which means that the NAS message includes an NSAPI and an IMS control message, the L3 control entity 1915 provides the NSAPI and the IMS control message to the switch 1910. The switch 1910 sends the IMS control message to a GTP tunnel indicated by the NSAPI.

As described above, one GTP tunnel is created for each PDP context between the SGSN and the GGSN (hereinafter, referred to as a Gn interface). Thus, an NSAPI matches to a GTP tunnel of the Gn interface in a one to one correspondence.

The GTP tunnel 1905 of the Gn interface sends the IMS control message received from the switch 1910 to the GGSN. The GGSN will send the IMS control message to an IMS controller according to an IP address.

Figure 20:
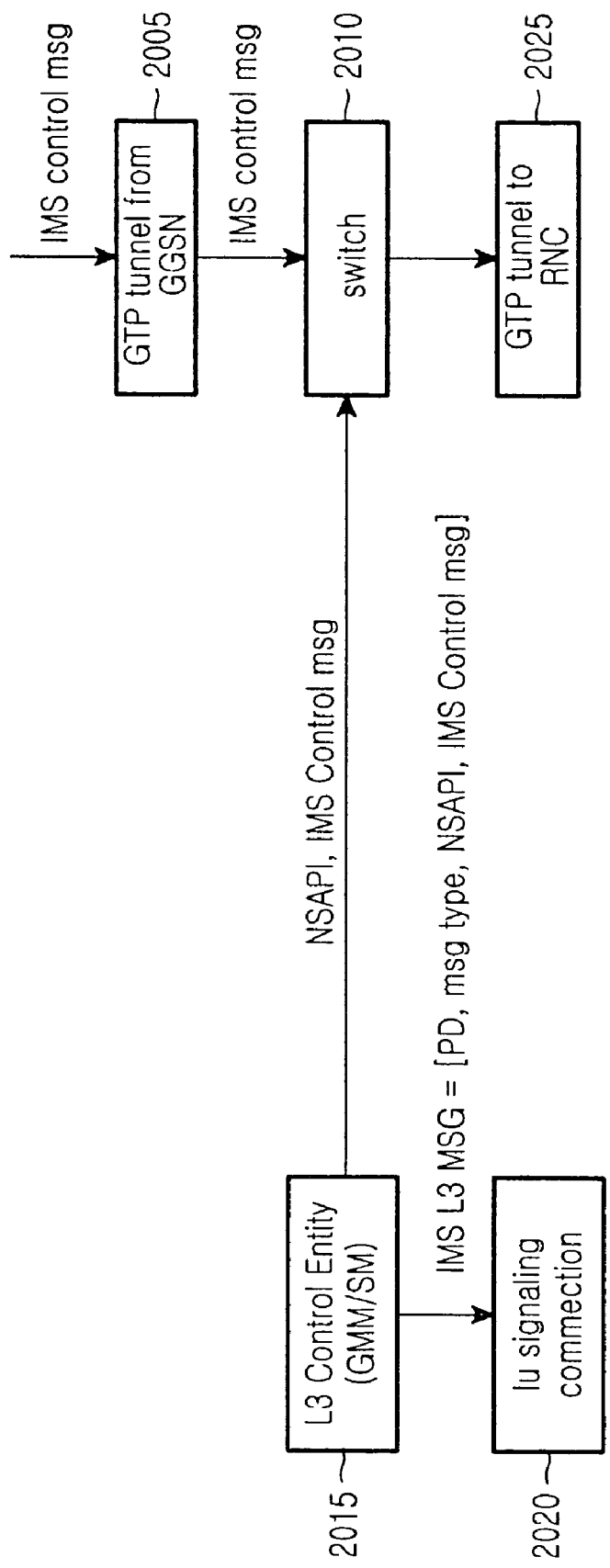
FIG. 20 illustrates the downlink structure of the SGSN according to the third embodiment of the present invention.

FIG. 20 illustrates the downlink structure of the SGSN according to the third embodiment of the present invention.

Referring to FIG. 20, the downlink configuration of the SGSN includes an Iu signaling connection 2020, a GTP tunnel 2025 between the GGSN and the RNC, an L3 control entity 2015, a switch 2010, and a GTP tunnel 2005 between the GGSN and the SGSN.

Upon receipt of data, the GTP tunnel 2005 provides the data to the switch 2010. The switch 2010 sends the data to the GTP tunnel 2025 or the L3 control entity 2015.

The operation of the switch 2010 will be described stepwise in detail below.

In step 1, the switch 2010 receives data from the GTP tunnel 2005.

In step 2, the switch 2010 determines whether the received data is an IMS control message. If it is an IMS control message, the switch 2010 goes to step 4. If it is user data, the switch 2010 goes to step 3.

In step 3, the switch 2010 sends the data to the GTP tunnel 2025 associated with the GTP tunnel 2005 and waits until receiving the next data.

As described above, one GTP tunnel is established for each PDP context between the GGSN and the SGSN (i.e. the Gn interface) and one GTP tunnel is established between the SGSN and the RNC (i.e. the Iu interface). Therefore, a one to one correspondence is set between the GTP tunnel of the Gn interface and the GTP tunnel of the Iu interface.

In step 4, the switch 2010 determines whether the GTP tunnel of the Iu interface corresponding to the GTP tunnel of the Gn interface has been established, that is, whether a user plane for processing the IMS control message has been configured in the UTRAN. In the presence of the user plane, the switch 2010 goes to step 5. In the absence of the user plane, it jumps to step 6.

In step 5, since the user plane for processing the IMS control message has already been established, the switch 2010 sends the IMS control message to the GTP tunnel 2025 of the Iu interface and waits until receiving the next data.

In step 6, since the user plane for processing the IMS control message has not been established, the switch 2010 sends the IMS control message to the L3 control entity 2015. At the same time, the switch 2010 sends the NSAPI of the GTP tunnel through which the IMS control message has been received and waits until receiving the next data.

The L3 control entity 2015 includes a PD, a Message Type, the NSAPI, and the IMS control message in an IMS L3 message and sends it through the Iu signaling connection 2020.

Figure 21:
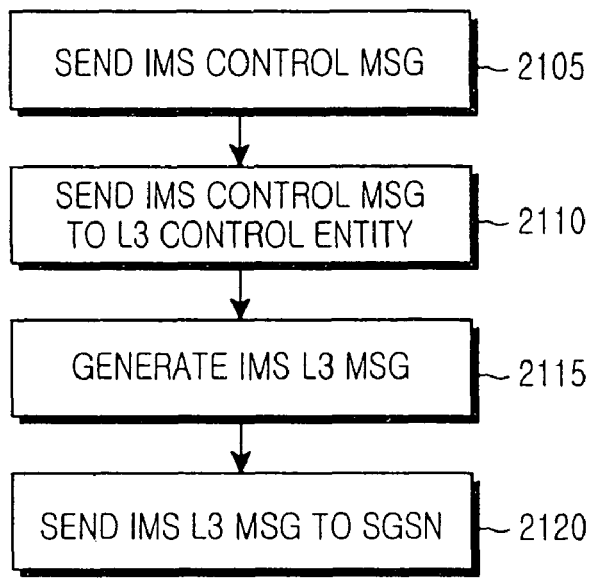
FIG. 21 is a flowchart illustrating an operation for processing an uplink IMS control message in the UE according to the third embodiment of the present invention.

FIG. 21 is a flowchart illustrating an operation for processing an uplink IMS control message in the UE according to the third embodiment of the present invention.

Referring to FIG. 21, an IMS control message is generated in the IMS control entity of the UE at an arbitrary time in step 2105. The IMS control message can be an SIP message.

The IMS control message is provided to the L3 control entity in step 2110. The L3 control entity is a layer for processing NAS messages. For example, the L3 control entity can be a GMM or SM layer.

The L3 control layer constructs an IMS L3 control message by including the IMS control message in an L3 control message in step 2115. The IMS L3 control message refers to a typical L3 message including an IMS control message. An existing L3 message or a newly defined L3 message can be used as the IMS L3 control message.

In addition to the IMS control message, the IMS L3 message may further include the NSAPI of a PDP context associated with an entity from which the IMS control message has been generated.

The UE sends the IMS L3 message to the SGSN in step 2120.

Figure 22:
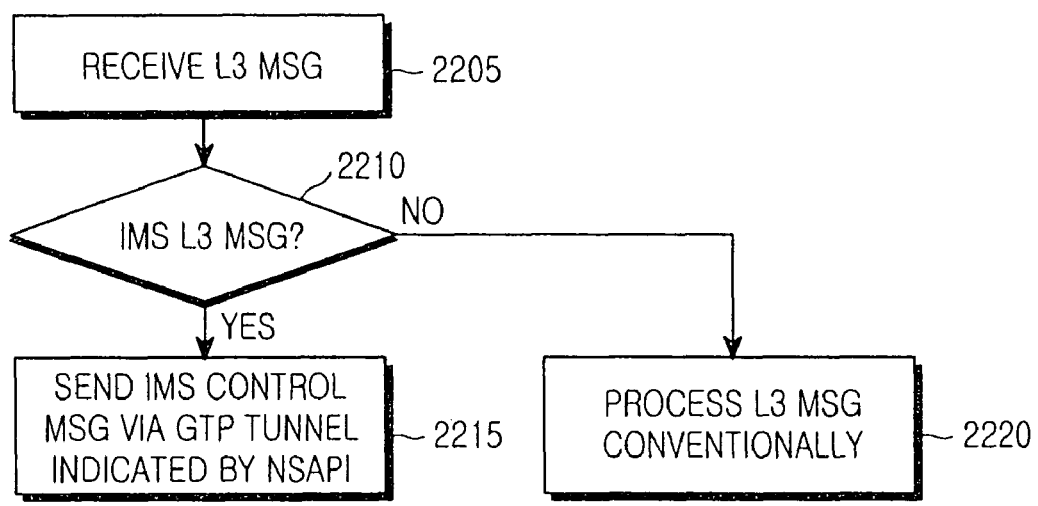
FIG. 22 is a flowchart illustrating an operation for processing an uplink IMS control message in the SGSN according to the third embodiment of the present invention.

FIG. 22 is a flowchart illustrating an operation for processing an uplink IMS control message in the SGSN according to the third embodiment of the present invention.

Referring to FIG. 22, the SGSN receives an L3 message in step 2205 and determines whether the L3 message is an IMS L3 message in step 2210. If the L3 message is an IMS L3 message, the SGSN goes to step 2215 and otherwise, it goes to step 2220.

In step 2215, the SGSN checks the NSAPI of the IMS L3 message and sends an IMS control message included in the IMS L3 message to the GGSN through a GTP tunnel established for a PDP context indicated by the NSAPI. If the NSAPI is not included in the IMS L3 message, the SGSN can detect an appropriate GTP tunnel by checking the IP address and the UDP port of the IMS control message.

In step 2220, the SGSN processes the L3 message as done conventionally.

Figure 23:
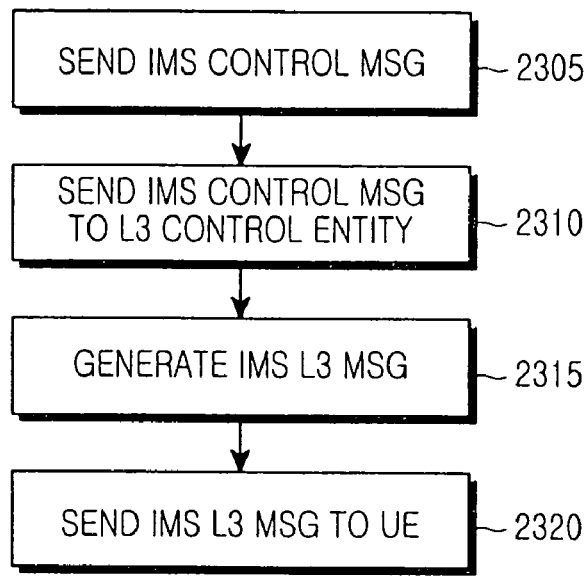
FIG. 23 is a flowchart illustrating an operation for processing a downlink IMS control message in the SGSN according to the third embodiment of the present invention.

FIG. 23 is a flowchart illustrating an operation for processing a downlink IMS control message in the SGSN according to the third embodiment of the present invention.

Referring to FIG. 23, the SGSN receives an IMS control message from the GGSN at an arbitrary time in step 2305.

The IMS control message can be an SIP message. The SGSN determined whether the received message is an IMS control message by a GTP tunnel from which the message has been received. If the message has been received from a GTP tunnel associated with a signaling PDP context, this message is an IMS control message, In step 2310, the SGSN sends the IMS control message to the L3 control entity. The L3 control entity is a layer for processing NAS messages. It can be a GMM or SM layer.

The L3 control layer constructs an IMS L3 control message by including the IMS control message in an L3 control message in step 2315. The IMS L3 control message refers to a typical L3 message including an IMS control message. An existing L3 message or a newly defined L3 message can be used as the IMS L3 control message. In addition to the IMS control message, the IMS L3 message may further include the NSAPI of a PDP context associated with an entity from which the IMS control message has been generated.

The SGSN sends the IMS L3 message to the UE in step 2320.

Figure 24:
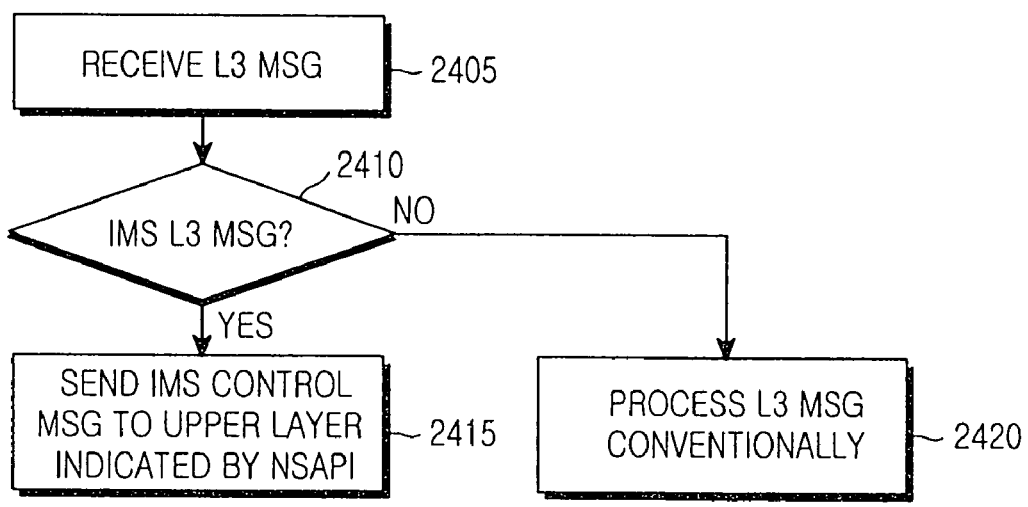
FIG. 24 is a flowchart illustrating an operation for processing a downlink IMS control message in the UE according to the third embodiment of the present invention.

FIG. 24 is a flowchart illustrating an operation for processing a downlink IMS control message in the UE according to the third embodiment of the present invention.

Referring to FIG. 24, upon receipt of an L3 message in step 2405, the UE determines whether the L3 message is an IMS L3 message based on the PD and Message Type of the L3 message in step 2410.

If the L3 message is an IMS L3, the UE goes to step 2415 and otherwise, it goes to step 2420.

In step 2415, the UE checks the NSAPI of the IMS L3 message and sends an IMS control message included in the IMS L3 message to an upper layer indicated by the NSAPI. If the NSAPI is not included in the IMS L3 message, the UE can detect an appropriate GTP tunnel by checking the IP address and the UDP port of the IMS control message.

In step 2420, the UE processes the L3 message as done conventionally.

Figure 25:
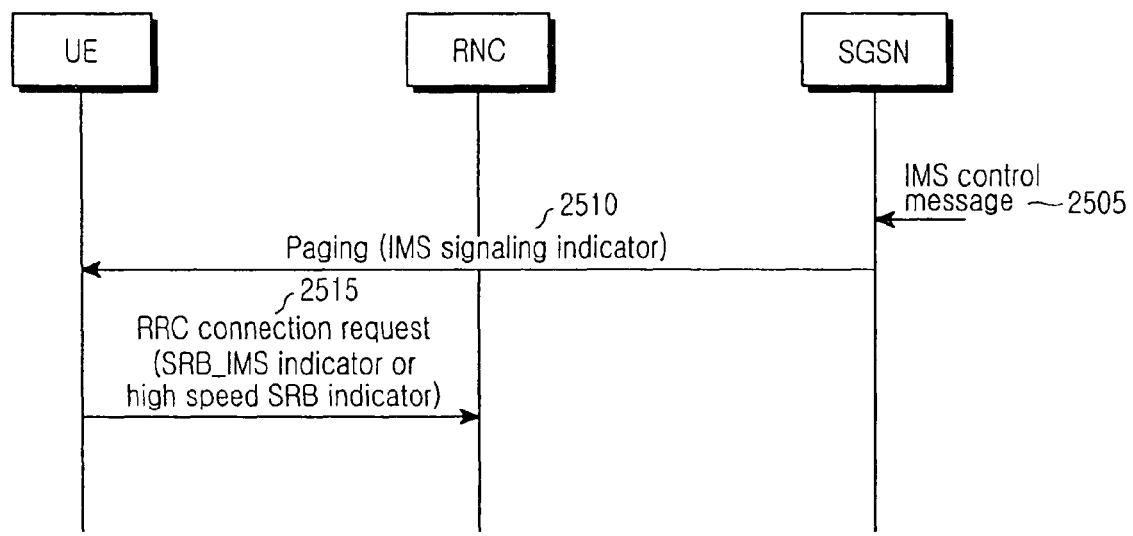
FIG. 25 illustrates an operation according to a fourth embodiment of the present invention.

FIG. 25 illustrates an operation according to a fourth embodiment of the present invention.

Referring to FIG. 25, the SGSN receives an IMS control message in step 2505. If the following conditions are fulfilled, the SGSN includes information indicating incoming of the IMS control message in a PAGING message.

In accordance with the fourth embodiment of the present invention, the information is an IMS signaling indicator. The IMS signaling indicator can be set as one of PAGING CAUSE values. PAGING CAUSE is inserted in an existing PAGING message. It indicates the cause of paging. Therefore, a new paging cause value is defined to indicate paging due to incoming of an IMS control message.

The conditions for the SGSN to include the IMS signaling indicator in the PAGING message are as follows.

First, the UE is in an idle state and the SGSN receives downlink data from the GGSN. If the downlink data is a message associated with a signaling PDP context, the SGSN considers that the downlink data is an IMS control message. Data transmitted/received through a GTP tunnel is called a GTP-PDU and the SGSN identifies a PDP context associated with the GTP PDU referring to the GTP PDU header of the received GTP PDU.

If the GTP-PDU received in step 2505 is associated with the signaling PDP context, this implies that the GTP-PDU has an IMS control message encapsulated therein.

In step 2510, the SGSN sends a PAGING message to the UE. The PAGING message includes information indicating that the PAGING message has been issued because of incoming of the IMS control message.

The UE receives the PAGING message in step 2515. If the PAGING message includes the information indicating that the PAGING message has been issued because of incoming of the IMS control message, the UE establishes an RRC connection and notifies the RNC that the IMS control message needs to be transmitted/received rapidly.

That is, an SRB_IMS indicator or a high-speed_SRB indicator is included in an RRC CONNECTION REQUEST message or an RRC CONNECTION SETUP COMPLETE message. Or if any other method than proposed in the present invention is used in order to rapidly process an IMS control message, information requesting a corresponding operation is set in the RRC CONNECTION REQUEST message or the RRC CONNECTION SETUP COMPLETE message.

If the information is included in the RRC CONNECTION REQUEST message or the RRC CONNECTION SETUP COMPLETE message, the RNC performs an appropriate operation to fast process the IMS control message. For example, the RNC sets up a high-speed SRB or SRB_IMS.

Figure 26:
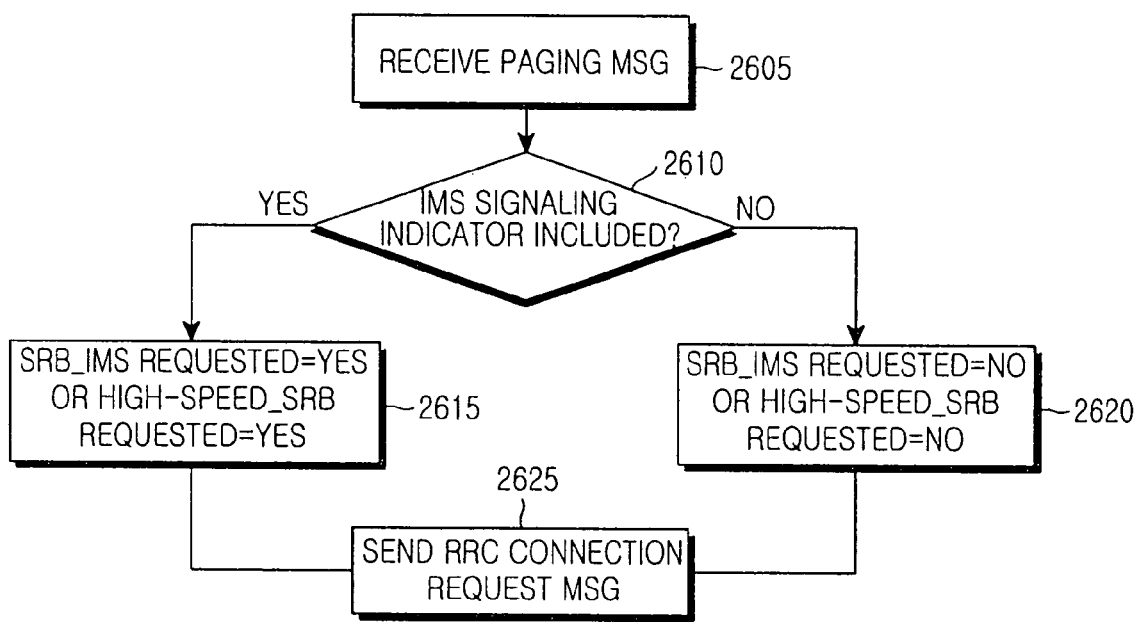
FIG. 26 is a flowchart illustrating the operation of the UE, upon receipt of a PAGING message according to the fourth embodiment of the present invention.

FIG. 26 is a flowchart illustrating the operation of the UE, upon receipt of a PAGING message according to the fourth embodiment of the present invention.

Referring to FIG. 26, upon receipt of a PAGING message in step 2605, the UE determines whether the PAGING message includes an IMS signaling indicator indicating generation of the PAGING message due to incoming of an IMS control message.

In the presence of an IMS signaling indicator, the UE goes to step 2615. In the absence of an IMS signaling indicator, the UE proceeds to step 2620.

In step 2615, the UE constructs an RRC CONNECTION REQUEST message and an SRB_IMS indicator to YES or NO in the message.

In the first and second embodiments described before, an IMS control message is transmitted/received through a novel SRB. Therefore, the UE sets the SRB_IMS indicator to YES to request setup of an SRB for processing the IMS control message.

On the other hand, since the IMS control message is transmitted/received through an existing SRB, there is no need for setting up a new SRB in the third embodiment of the present invention. However, since the IMS control message is bulky, a faster SRB than a 3.4-kbps SRB must be established. Hence, the UE sets a high-speed_SRB indicator to YES. The RNC, upon receipt of an RRC CONNECTION REQUEST message including the high-speed_SRB indicator set to YES, establishes a faster SRB than 13.6 kbps.

In step 2620, since the PAGING message is not related to an IMS control message, the UE sets SRB_IMS requested to NO or high-speed SRB requested to No.

In step 2625, the UE sends the RRC CONNECTION REQUEST message to the RNC.

In the case where the fourth embodiment is implemented in conjunction with the first or second embodiment, the UE sets SRB_IMS requested. If the fourth embodiment is implemented in conjunction with the third embodiment, the UE sets high-speed SRB requested.

The present invention that is implemented as described above has the following major effects.

The present invention offers the benefit of efficient transmission of an IMS control message. Also, since the IMS control message is transmitted/received using an existing control plane, a time delay involved in a call setup procedure can be reduced.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of transmitting/receiving a control message related to a packet call service in an IMS (IP Multimedia Subsystem) service, comprising the steps of:
determining whether a UE (User Equipment) has registered to the IMS service by the UE, upon receipt of an RRC (Radio Resource Control) connection request;
setting an SRB_IMS (Signaling Radio Bearer_IMS) requested parameter requesting processing of an IMS control message through an SRB by the UE, depending on whether the UE has registered to the IMS service;
transmitting an RRC connection request message including the SRB_IMS requested parameter to an RNC (Radio Network Controller) by the UE; and
configuring an SRB_IMS entity by the UE.

2. The method of claim 1, wherein the determining step comprises the step of receiving the RRC connection request from an SGSN (Serving GPRS Support Node) by an RRC layer of the UE.

3. The method of claim 1 or claim 2, wherein the setting step comprises the step of setting the RB_IMS requested parameter depending on whether the UE has registered to the IMS service.

4. The method of claim 1 or claim 2, further comprising, before the determining step, the step of setting up a signaling PDP context with the SGSN by the UE.

5. The method of claim 4, further comprising, after the signaling PDP context setup step, the step of transitioning to an idle state by the UE.

6. The method of claim 4, wherein the signaling PDP context setup step comprises the steps of:
turning on power by the UE;
transmitting an active PDP context request message to the SGSN via the RRC connection and an Iu signaling connection by the UE;
establishing a GTP (GPRS Tunneling Protocol) tunnel with an SGSN (Gateway GPRS Support Node) by the SGSN;associating the FTP tunnel with the Iu signaling connection;
transmitting an active PDP context response message to the UE by the SGSN; and
registering to an IMS control node by the UE.

7. The method of claim 6, wherein the active PDP context request message includes information indicating a PDP context.

8. The method of claim 1 or claim 2, further comprising, after the configuring step, the steps of:
receiving a NAS (Non Access Stratum) message from the UE by the RNC;
determining whether the NAS message has been received through the SRB_IMS entity;
attaching an IMS indicator indicating reception of the NAS message through the SRB_IMS entity to the NAS message by the RNC, if the NAS message has been received through the SRB_IMS entity; and
transmitting the NAS message including the IMS indicator to the SGSN via the Iu signaling connection by the RNC.

9. The method of claim 8, further comprising, after the NAS message transmitting step, the steps of:
checking the IMS indicator by the SNSG; and
considering that the NAS message is an IMS control message and transmitting the NAS message to the GGSN via the GTP tunnel indicated by the signaling PDP context by the SGSN, if the IMS indicator indicates reception of the NAS message through the SRB_IMS entity, and considering the NAS message is not an IMS control message and transmitting the NAS message to the GGSN via an MM (Mobility Management)/SM (Session Management) block by the SGSN, if the IMS indicator does not indicate reception of the NAS message through the SRB_IMS entity.

10. The method of claim 1 or claim 2, wherein the transmitting step comprises the step of including information indicating a GTP tunnel to transmit the IMS control message through in the NAS message including the IMS control message.

11. The method of claim 10, wherein the information indicating a GTP tunnel to transmit the IMS control message through is included in an NSAPI (Network Service Access Point Identification).

12. The method of claim 11, wherein the NSAPI identifies a PDP context between the UE and the SGSN and is valid only for the UE.

13. A method of transmitting/receiving a control message related to a packet call service in an IMS (IP Multimedia Subsystem) service, comprising the steps of:
receiving from a UE (User Equipment) an RRC (Radio Resource Control) connection request message including an SRB_IMS (Signaling Radio Bearer_IMS) requested parameter requesting processing an IMS control message through an SRB;
configuring an SRB_IMS entity according to the SRB_IMS requested parameter;
receiving an IMS control message including an IMS indicator from an SGSN (Serving GPRS Support Node) by an RNC (Radio Network Controller);
checking the IMS indicator by the RNC; and
transmitting a NAS message to the UE via the SRB_IMS entity by the RNC, if the IMS indicator indicates that the NAS message is an IMS control message.

14. The method of claim 13, further comprising the step of transmitting the NAS message to the UE via an SRB 3 entity or an SRB 4 entity by the RNC if the IMS indicator indicates that the NAS message is not an IMS control message.

15. The method of claim 13 or claim 14, further comprising, after the SRB_IMS entity configuring step, the steps of:
receiving packet data from a GGSN (Gateway GPRS Support Node) via a GTP (GPRS Tunneling Protocol) tunnel by the SGSN;
determining whether the GTP tunnel is indicated by a signaling PDP context by the SGSN; and
transmitting the NAS message to the RNC according to the determination by the SGSN.

16. The method of claim 15, further comprising the step of attaching an IMS indicator to the packet data to indicate that the packet data is an IMS control message by the SGSN, if the GTP tunnel is indicated by the signaling PDP context, and transmitting the packet data with the IMS indicator to the RNC via an Iu signaling connection by the SGSN.

17. The method of claim 16, further comprising the step of attaching an IMS indicator to the packet data to indicate that the packet data is not an IMS control message by the SGSN, if the GTP tunnel is not indicated by the signaling PDP context, and transmitting the packet data with the IMS indicator to the RNC via the GTP tunnel by the SGSN.

18. A UE (User Equipment) device for transmitting/receiving a control message related to a packet call service using a control plane in an IMS (IP Multimedia Subsystem) service, comprising:
- an RRC (Radio Resource Control) layer having an AS (Access Stratum) handler and a NAS (Non Access Stratum) handler, for receiving an RRC connection request message from an SGSN (Serving GPRS Support Node);
- an IMS controller for processing an IMS control message used for signaling of a call setup in the control plane; and
- a plurality of SRBs (Signaling Radio Bearers) for transmitting/receiving messages between the RRC layer and radio channels,
- wherein the SRBs include an SRB_IMS entity for providing the IMS control message to the IMS controller via the NAS handler; and
- wherein the UE sends an SRB_IMS requested parameter to an RNC (Radio Network Controller) and receives the IMS control message through an SRB_IMS entity of the RNC configured according to the SRB_IMS requested parameter.

19. The UE device of claim 18, wherein the SRBs include SRB 0, SRB 1 and SRB 2 for transmitting an RRC message generated from the AS handler on a radio channel.

20. The UE device of claim 18 or claim 19, wherein the SRBs include SRB 3 and SRB 4 for processing an MM (Mobility Management)/CC (Call Control)/SM (Session Management) control message generated from the NAS handler.

21. A method of transmitting/receiving a control message related to a packet call service in an IMS (IP Multimedia Subsystem) service, comprising the steps of:
- receiving from a UE (User Equipment) an RRC (Radio Resource Control) connection request message including an SRB_IMS (Signaling Radio Bearer_IMS) requested parameter requesting processing an IMS control message through an SRB by an RNC (Radio Network Controller);
- configuring an SRB_IMS entity according to the SRB_IMS requested parameter by the RNC;
- receiving from an SGSN (Serving GPRS Support Node) an IMS control message including information indicating a GTP (GPRS Tunneling Protocol) tunnel to transmit the IMS control message through by the RNC; and
- transmitting a NAS message including the IMS control message to the UE via the SRB_IMS entity by the RNC.

22. The method of claim 21, wherein the information indicating a GTP tunnel to transmit the IMS control message through is included in an NSAPI (Network Service Access Pint Identification).

23. The method of claim 22, wherein the NSAPI identifies a PDP context between the UE and the SGSN and is valid only for the UE.

24. The method of claim 22, wherein the IMS control message transmitting step comprises the step of transmitting the IMS control message to the UE via the GTP tunnel identified by the NSAP included in the IMS control message by the RNC.

25. A UE (User Equipment) device for transmitting/receiving a control message related to a packet call service using a control plane in an IMS (IP Multimedia Subsystem) service, comprising:
- an RRC (Radio Resource Control) layer having an AS (Access Stratum) handler and a NAS (Non Access Stratum) handler, for receiving an RRC connection request message from an SGSN (Serving GPRS Support Node);
- an IMS controller for processing an IMS control message and including information indicating a GTP (GPRS Tunneling Protocol) tunnel to transmit the IMS control message used for signaling of a call setup in the control plane through in the IMS control message; and
- a plurality of SRBs (Signaling Radio Bearers) for transmitting/receiving messages between the RRC layer and radio channels,
- wherein the SRBs include an SRB_IMS entity for providing the IMS control message to the IMS controller via the NAS handler; and
- wherein the UE sends an SRB_IMS requested parameter to an RNC (Radio Network Controller) and receives the IMS control message through an SRB_IMS entity of the RNC configured according to the SRB_IMS requested parameter.

26. The UE device of claim 25, wherein the information indicating a GTP tunnel to transmit the IMS control message through is included in an NSAPI (Network Service Access Pint Identification).

27. The UE device of claim 26, wherein the NSAPI identifies a PDP context between the UE and the SGSN and is valid only for the UE.

28. The UE device of any one of claims 25, 26 and 27, wherein the SRBs include SRB 0, SRB 1 and SRB 2 for transmitting an RRC message generated from the AS handler on a radio channel.

29. The UE device of claim 28, wherein the SRBs include SRB 3 and SRB 4 for processing an MM (Mobility Management)/CC (Call Control)/SM (Session Management) control message generated from the NAS handler.

30. A method of transmitting/receiving a control message related to a packet call service using a control plane in an IMS (IP Multimedia Subsystem) service, comprising the steps of:
- generating an IMS control message used for signaling of a call setup in the control plane, after setting up an RRC (Radio Resource Control) connection by a UE (User Equipment);
- including the IMS control message in an L3 (Layer 3) message by an L3 control entity processing an NAS message in the UE; and
- transmitting the L3 message to an SGSN (Serving GPRS Support) node via an SRB (Signaling Radio Bearer) entity for processing an RRC message related to GMM (GPRS Mobility Management)/SM (Session Management) by the UE.

31. The method of claim 30, wherein the L3 message further includes information indicating a GTP (GPRS Tunneling Protocol) tunnel to transmit the IMS control message through.

32. The method of claim 31, wherein the information indicating a GTP tunnel to transmit the IMS control message through is included in an NSAPI (Network Service Access Point Identification).

33. The method of claim 32, further comprising, after the L3 message transmitting step, the step of transmitting the IMS control message to a destination via the GTP tunnel indicated by the NSAPI included in the L3 message by the SGSN.

34. The method of claim 30, wherein the IMS control message is one of an SIP (Session Initiation Protocol) message or an RTCP (Real-time Transport Control Protocol) packet for PoC (Push to talk over Cellular) service.

35. The method of claim 32, wherein the NSAPI is the identifier of a signaling PDP context configured for SIP or the identifier of a PDP context configured for an RTCP flow.

36. A method of transmitting/receiving a control message related to a packet call service in an IMS (IP Multimedia Subsystem) service, comprising the steps of:
- receiving data from a GGSN (Gateway GPRS Support Node) through a first GTP (GPRS Tunneling Protocol) tunnel by an SGSN (Serving GPRS Support Node);
- determining whether a second GTP tunnel to an RNC (Radio Network Controller) corresponding to the first GTP tunnel has been established by the SGSN, if the data is an IMS control message;
- generating an L3 (Layer 3) message including information identifying the first GTP tunnel and the IMS control message by the SGSN, if the second GTP tunnel has not been established; and
- transmitting the L3 message to an SRB (Signaling Radio Bearer) entity for processing an RRC (Radio Resource Control) message related to GMM (GPRS Mobility Management)/SM (Session Management) of a UE (User Equipment), by the SGSN.

37. The method of claim 36, further comprising the step of transmitting the IMS control message to the RNC through the second GTP tunnel by the SGSN, if the second GTP tunnel has been established.

38. The method of claim 36, further comprising the step of transmitting, if the received data is not the IMS control message but user data, the user data to the RNC through the second GTP tunnel by the SGSN.

39. The method of any of claims 36, 37 and 38, wherein the L3 message further includes an NSAPI (Network Service Access Point Identification).

40. The method of claim 39, further comprising, after the L3 message transmitting step, the steps of:
- receiving the L3 message through the SRB entity for processing a GMM/SM-related RRC message, by the UE; and
- transmitting the IMS control message included in the L3 message to an entity indicated by the NSAPI by the UE.

41. The method of claim 40, wherein the entity indicated by the NSAPI is one of an SIP (Session Initiation Protocol) client or an RTCP (Real-time Transport Control Protocol) entity for PoC (Push to talk over Cellular) service.

42. A UE (User Equipment) device for transmitting/receiving a control message related to a packet call service using a control plane in an IMS (IP Multimedia Subsystem) service, comprising:
- an IMS controller for generating and processing an IMS control message;
- an L3 (Layer 3) controller for generating and processing an L3 message;
- a switch for switching the IMS controller to the L3 controller or a radio bearer; and
- an SRB (Signaling Radio Bearer) entity switched to the switch through the L3 controller, for processing the IMS control message.

43. The UE device of claim 42, wherein the SRB entity processes a GMM (GPRS Mobility Management)/SM (Session Management)-related RRC (Radio Resource Control) message.

44. The UE device of claim 43, wherein the SRB entity is SRB 3 or SRB 4.

45. The UE device of claim 44, wherein the L3 message includes information indicating a GTP (GPRS Tunneling Protocol) tunnel to transmit the IMS control message through.

46. The UE device of claim 45, wherein the information indicating a GTP tunnel to transmit the IMS control message through includes an NSAPI (Network Service Access Point Identification).

47. The UE device of claim 46, wherein the switch transmits the IMS control message to an entity indicated by the NSAPI.

48. The UE device of claim 47, wherein the entity indicated by the NSAPI is one of an SIP (Session Initiation Protocol) client or an RTCP (Real-time Transport Control Protocol) entity for PoC (Push to talk over Cellular) service.

49. A method of transmitting/receiving a control message related to a packet call service in an IMS (IP Multimedia Subsystem) service, comprising the steps of:
- receiving from an SGSN (Serving GPRS Support Node) a paging message including an IMS signaling indicator indicating incoming of an IMS control message in the SGSN by a UE (User Equipment);
- transmitting to an RNC (Radio Network Controller) an RRC connection request message including an SRB_IMS (Signaling Radio Bearer_IMS) requested parameter requesting processing the IMS control message through an SRB in response to the IMS signaling indicator, by the UE; and
- configuring an SRB_IMS entity for processing the IMS control message by the UE.

50. The method of claim 49, further comprising, after the SRB_IMS entity configuring step, the steps of:
- receiving a NAS (Non Access Stratum) message from the UE by the RNC;
- determining whether the NAS message has been received through the SRB_IMS entity by the RNC;
- attaching an IMS indicator indicating reception of the NAS message through the SRB_IMS entity to the NAS message by the RNC, if the NAS message has been received through the SRB_IMS entity; and
- transmitting the NAS message with the IMS indicator to the SGSN via an Iu signaling connection by the RNC.

51. The method of claim 50, further comprising, after the step of transmitting the NAS message with the IMS indicator, the steps of:
- checking the IMS indicator by the SGSN; and
- considering that the NAS message is an IMS control message and transmitting the NAS message to the GGSN through a GTP tunnel indicated by the signaling PDP context by the SGSN, if the IMS indicator indicates reception of the NAS message through the SRB_IMS entity, and considering that the NAS message is not an IMS control message and transmitting the NAS message to the GGSN through an MM/SM (Mobility Management/Session Management) block by the SGSN, if the IMS indicator does not indicate reception of the NAS message through the SRB_IMS entity.

52. The method of claim 51, further comprising, after the SRB_IMS entity configuring step, the steps of:
- receiving from the UE the RRC connection request message including the SRB_IMS requested parameter by the RNC;
- configuring an SRB_IMS entity according to the parameter by the RNC;
- receiving an IMS control message including an IMS indicator from the SGSN by the RNC;
- checking the IMS indicator by the RNC; and
- transmitting the NAS message to the UE through the SRB_IMS entity by the RNC, if the IMS indicator indicates that the NAS message is an IMS control message.

53. The method of claim 49, further comprising, after the SRB_IMS entity configuring step, the steps of:
- receiving from the UE the RRC connection request message including the SRB_IMS requested parameter by the RNC;
- configuring an SRB_IMS entity according to the parameter by the RNC;
- receiving from the SGSN an IMS control message including information indicating a GTP tunnel to transmit the IMS control message through, by the RNC; and
- transmitting a NAS message including the IMS control message to the UE through the SRB_IMS entity by the RNC.

54. The method of claim 53, wherein the information indicating a GTP tunnel to transmit the IMS control message through is included in an NSAPI (Network Service Access Point Identification).

* * * * *